(12) United States Patent
Naganawa et al.

(10) Patent No.: US 7,722,236 B2
(45) Date of Patent: May 25, 2010

(54) VEHICLE HEADLAMP

(75) Inventors: Masahito Naganawa, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 181 days.

(21) Appl. No.: 11/703,120

(22) Filed: Feb. 7, 2007

(65) Prior Publication Data

US 2007/0183164 A1    Aug. 9, 2007

(30) Foreign Application Priority Data

Feb. 8, 2006    (JP)    .............................. 2006-030466

(51) Int. Cl.
*B60Q 1/00*    (2006.01)
*B60Q 3/04*    (2006.01)
*F21V 1/00*    (2006.01)
*F21S 8/10*    (2006.01)

(52) U.S. Cl. .................. 362/543; 362/507; 362/509; 362/516; 362/538; 362/544; 362/545; 362/520; 362/236; 362/245; 362/247; 362/327

(58) Field of Classification Search ......... 362/543–545, 362/507, 509, 538–539, 547, 475, 510, 516, 362/520, 236, 245, 247, 296.06, 311.06, 362/327, 346

See application file for complete search history.

(56) References Cited

U.S. PATENT DOCUMENTS

| | | | | |
|---|---|---|---|---|
| 6,007,223 A | * | 12/1999 | Futami | ........................ 362/517 |
| 6,976,775 B2 | * | 12/2005 | Koike | .......................... 362/545 |
| 2001/0019486 A1 | * | 9/2001 | Thominet | .................... 362/543 |

FOREIGN PATENT DOCUMENTS

| JP | 2004-095480 | 3/2004 |
|---|---|---|
| JP | 2005-141918 | 6/2005 |

* cited by examiner

*Primary Examiner*—Sharon E Payne
*Assistant Examiner*—Sean P Gramling
(74) *Attorney, Agent, or Firm*—Sughrue Mion, PLLC

(57) ABSTRACT

A vehicle headlamp is provided with an upper stage light source unit, a middle stage light source unit, and a lower stage light source unit. The upper stage light source unit, the middle stage light source unit, and the lower stage light source unit are provided at a lamp body constituting a lamp member by way of a support member. A low beam light distribution pattern is formed on a front side of a vehicle by overlapping light from the respective light source units. The lower stage light source unit includes two subunits, the two subunits commonly share a single cylindrical lens.

14 Claims, 22 Drawing Sheets

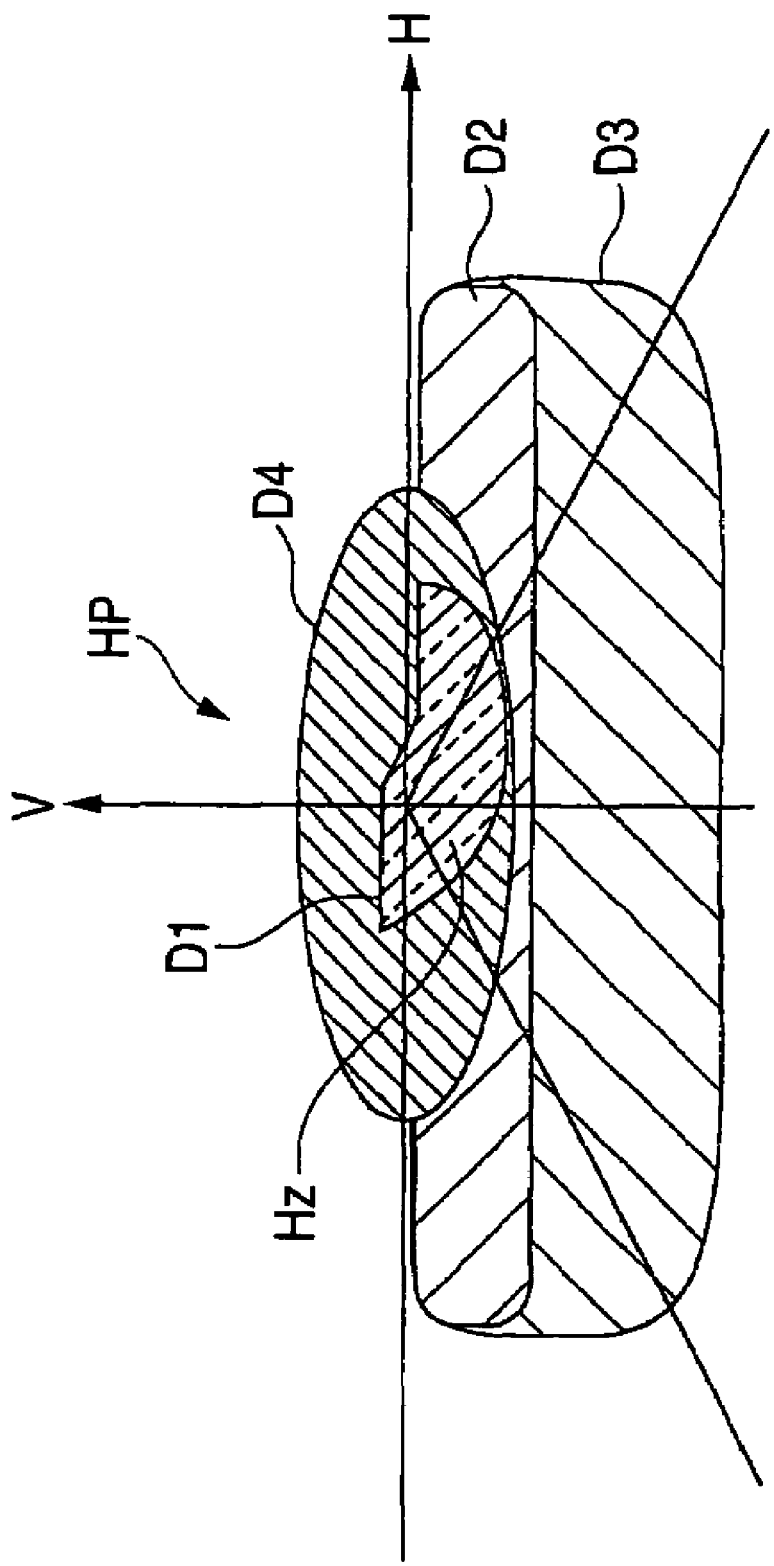

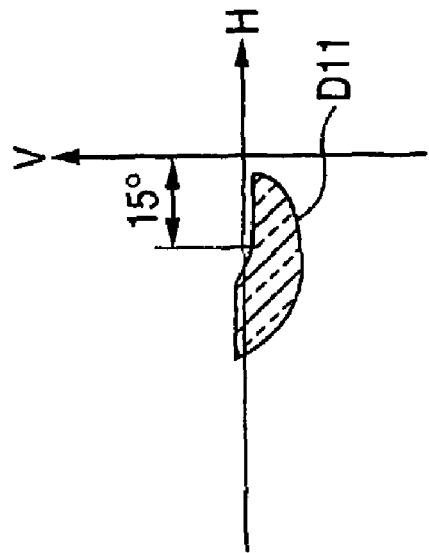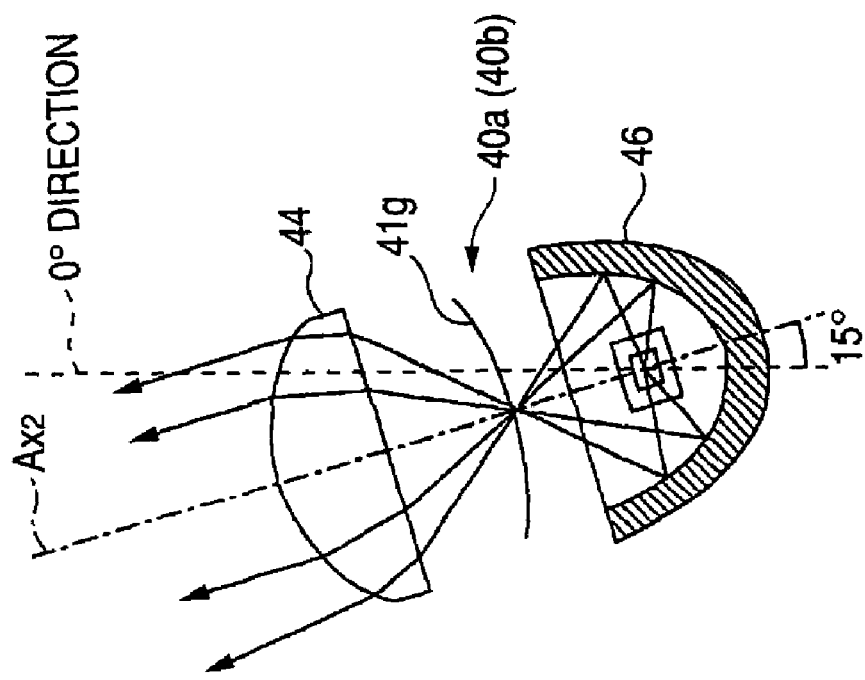

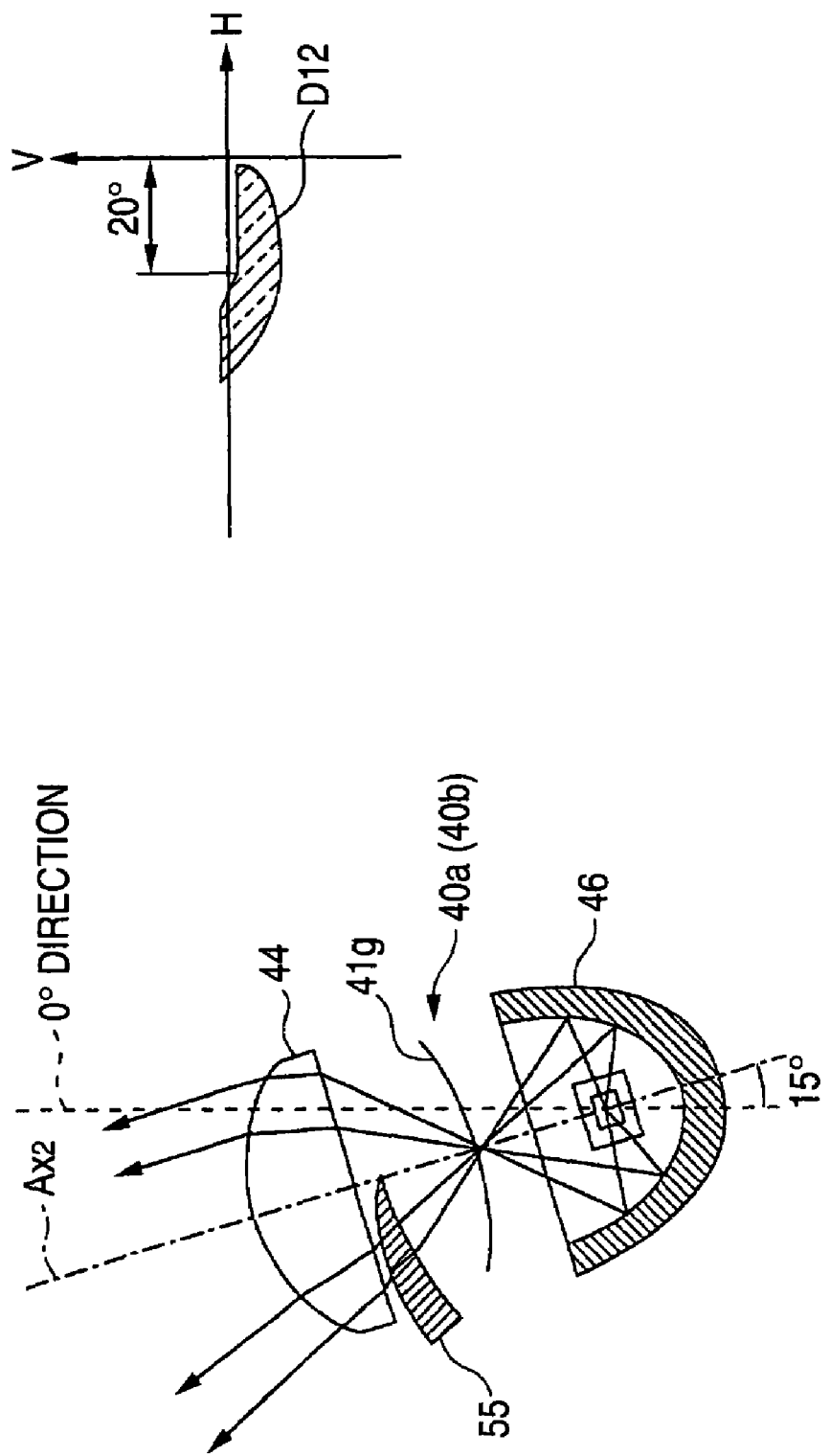

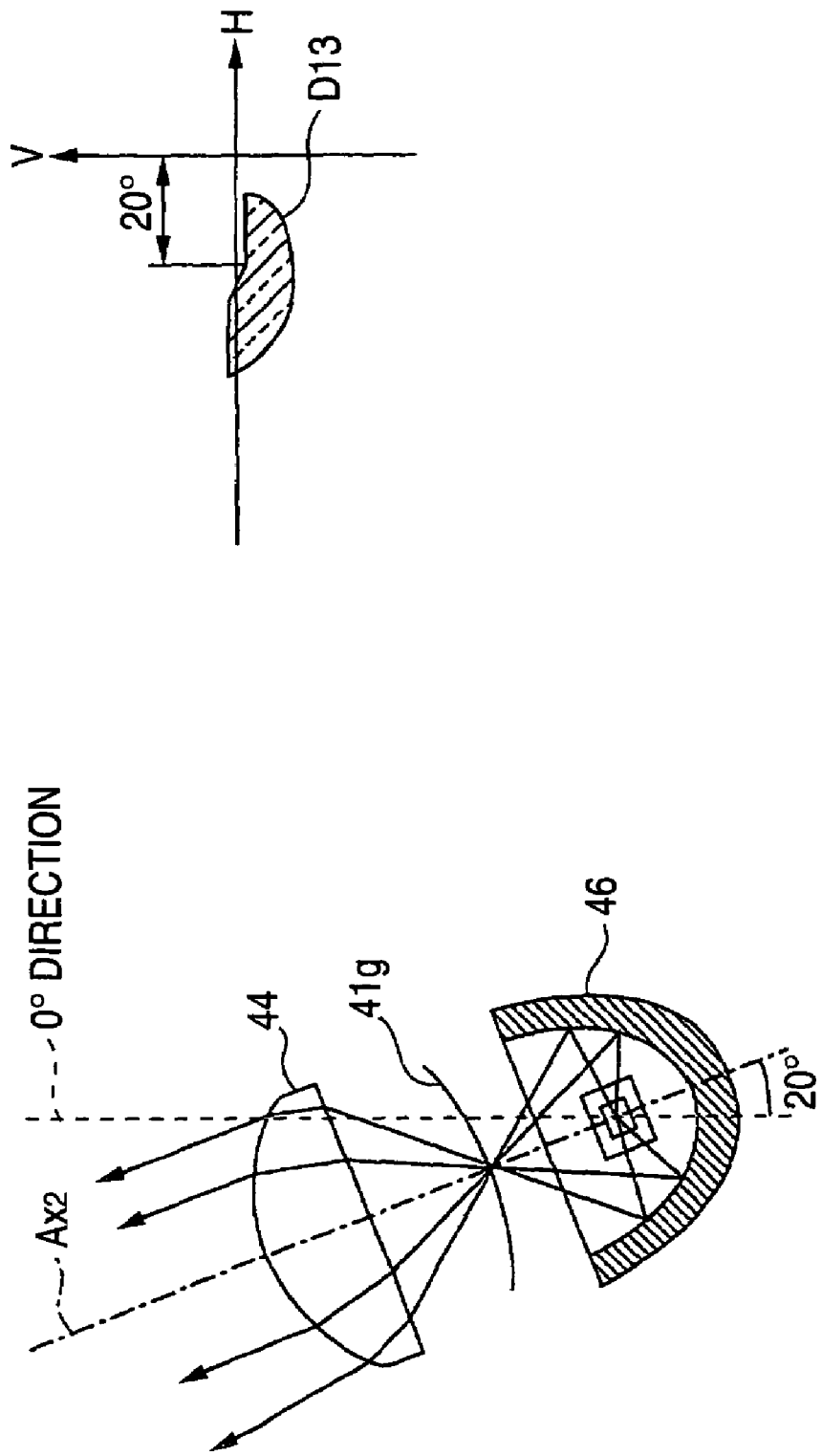

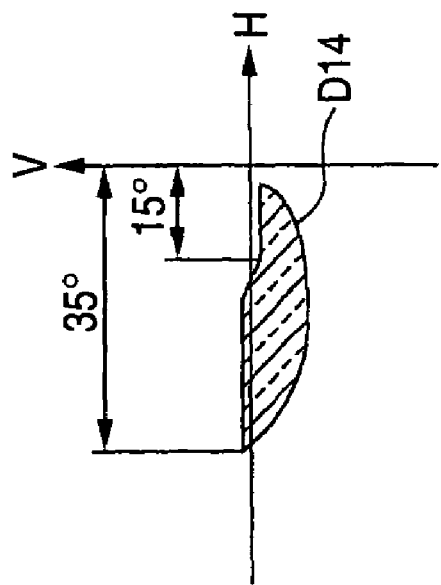
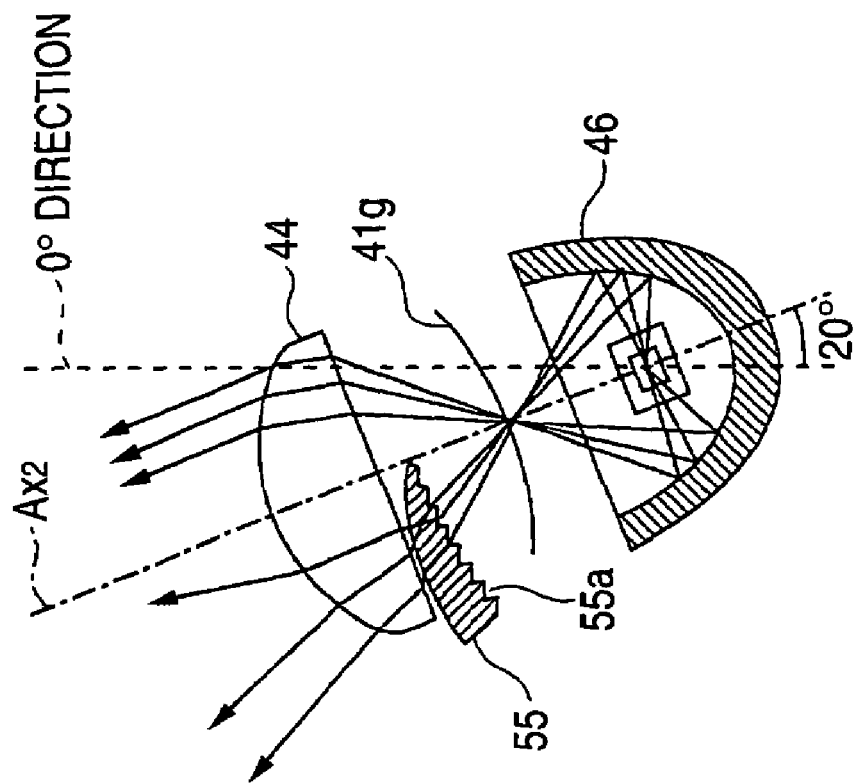

FIG. 16

| | | UPPER STAGE LAMP UNIT 20 (FOR HIGH BEAM) | MIDDLE STAGE LAMP UNIT 40 (FOR CUTTING CONVERGED LIGHT) | FIFTH SUBUNIT 70 (FOR LONG DISTANCE DIVERGING) | SIXTH SUBUNIT 80 (FOR SHORT DISTANCE DIVERGING) |
|---|---|---|---|---|---|
| BASIC LIGHT DISTRIBUTION | LOW BEAM | SWITCH OFF | SWITCH ON | SWITCH ON | SWITCH ON |
| | HIGH BEAM | SWITCH ON | (1) SWITCH ON<br>(2) SWITCH ON & PIVOT UNIT<br>(3) SWITCH ON & SWIVEL AND INCREASE LIGHT | SWITCH ON | SWITCH ON |
| | CURVE | SWITCH OFF | SWITCH ON & PIVOT UNIT | SWITCH ON | SWITCH ON |
| | TOWN | SWITCH OFF | (1) SWITCH ON & REDUCE LIGHT & PIVOT AND FIX UNIT BY 45°<br>(2) SWITCH ON & DIVERGE TO LOAD SHOULDER BY PIVOTING UNIT BY ANGLE EXCEEDING 20° | SWITCH ON | SWITCH ON |
| | MOTOR-WAY | SWITCH OFF | (1) SWITCH ON<br>(2) SWITCH ON & INCREASE LIGHT<br>DIRECT TOTAL IN UPPER DIRECTION BY 0.34° BY LEVELING | (1) SWITCH ON<br>(2) SWITCH ON & INCREASE LIGHT | (1) SWITCH ON<br>(2) SWITCH ON & INCREASE LIGHT |
| AFS LIGHT DISTRIBUTION | WET | SWITCH OFF | (1) SWITCH ON<br>(2) SWITCH ON & INCREASE LIGHT<br>(3) RIGHT SIDE LAMP PIECE: SWITCH ON & INCREASE LIGHT & PIVOT UNIT BY 8 THROUGH 15° IN LEFT DIRECTION<br>LEFT SIDE LAMP PIECE: SWITCH ON & INCREASE LIGHT<br>(4) RIGHT SIDE LAMP PIECE: SWITCH ON & INCREASE LIGHT & DIVERGE TO ROAD SHOULDER SIDE BY PIVOTING UNIT BY ANGLE EXCEEDING 20° IN LEFT DIRECTION<br>LEFT SIDE LAMP PIECE: SWITCH ON & INCREASE LIGHT<br>DIRECT TOTAL IN UPPER DIRECTION BY 0.34° BY LEVELING | (1) SWITCH ON<br>(2) SWITCH ON & INCREASE LIGHT | (1) SWITCH ON & REDUCE LIGHT<br>(2) SWITCH OFF |

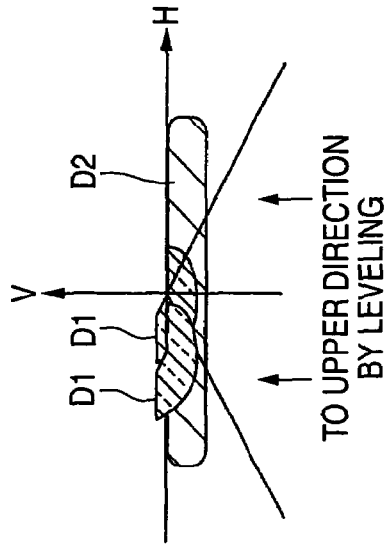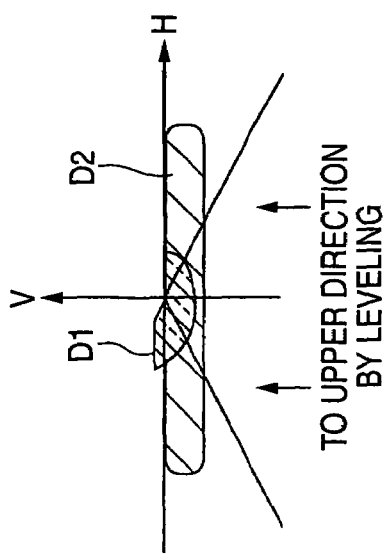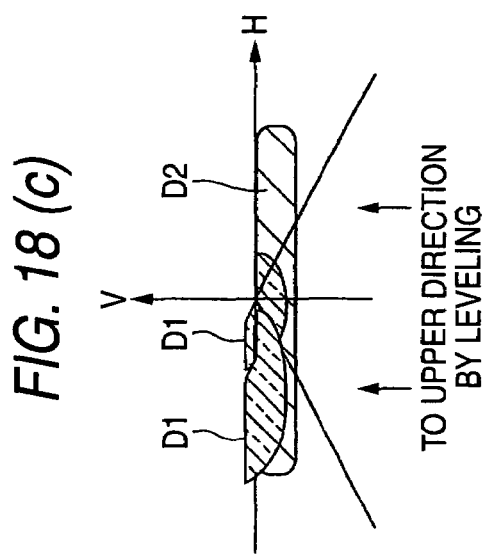

VEHICLE HEADLAMP

This application claims foreign priority from Japanese Patent Application No. 2006-030466, filed on Feb. 8, 2006, the entire contents of which are hereby incorporated by reference.

BACKGROUND OF THE INVENTION

1. Field of the Invention

The present invention relates to a vehicle headlamp, particularly relates to a vehicle headlamp for forming a predetermined light distribution pattern by overlapping light emitted from a plurality of light sources.

2. Related Art

In a background art, as a vehicle headlamp (headlamp), it is general to use a halogen bulb or a discharge bulb as a light source and reflect light emitted from the light source to a front side by using a reflector or a projecting lens. Although a halogen bulb or a discharge bulb is a light source capable of ensuring a sufficient light amount for vehicular use, a problem that power consumption is large is posed.

On the other hand, there is a high tendency of adopting a semiconductor light emitting element such as a light emitting diode as a light source for a vehicle headlamp. A light emitting diode is generally small-sized and power consumption thereof is small. Therefore, it is expected to realize to effectively use limited power by being applied to a vehicle mounted with a battery such as an automobile.

Although high luminance formation of a light emitting diode has been promoted, in comparison with a halogen bulb or a discharge bulb, a luminance thereof is not sufficient yet, and a light amount capable of sufficiently ensuring optical recognizability cannot be irradiated to a front side by simply replacing a halogen bulb or a discharge bulb by a light emitting diode. Therefore, currently, it is general to conceive such that a plurality of light source units respectively including light emitting diodes is mounted to a vehicle and a desired light distribution pattern is formed by over lapping light emitted from the light source units.

For example, JP-A-2004-095480 discloses a vehicle headlamp for forming a synthesized light distribution pattern for low beam by combining three pieces of units for forming a cutoff line, five pieces of units for forming a hot zone, three pieces of units for forming a diverging region. According to the vehicle headlamp, semiconductor light emitting elements are used in all of the units as the light sources, and the vehicle headlamp is constituted to form a light distribution pattern for low beam having a pertinent light amount by overlapping light distribution patterns formed by respectives thereof.

Further, JP-A-2005-141918 discloses a vehicle headlamp for forming a main light distribution by using a projector type light source unit using a discharge bulb, and using an additional light source unit using a semiconductor light emitting element, capable of being switched on and off and capable of being swiveled in a left and right direction and forming a synthesized light distribution pattern by overlapping and auxiliary light distribution on the main light distribution. According to the vehicle headlamp, for example, by switching on the additional light source unit in turning a vehicle and forming the additional light distribution pattern in a direction in accordance with a turning direction, side optical recognizability of a vehicle, particularly, optical recognizability in the turning direction can be promoted.

Meanwhile, when a synthesized light distribution pattern is intended to provide by combining a plurality of units as in JP-A-2004-095480, a number of the units is necessarily increased, a number of parts is increased and assembling performance is deteriorated in accordance therewith. Further, the constitution is not preferable in view of cost.

SUMMARY OF THE INVENTION

One or more embodiments of the present invention provide a vehicle headlamp capable of achieving excellent assembling performance by reducing a number of parts.

The invention is achieved by the following constitution.

(1) A vehicle headlamp provided with:

a plurality of light source units; and a lamp member for supporting the plurality of light source units;

wherein a low beam light distribution pattern is formed on a front side of a vehicle by overlapping light from the respective light source units;

wherein one of the plurality of the light source units includes:

a lens having a focal line extended in a horizontal direction and extended substantially along a direction of the focal line; and a first subunit and a second subunit for making light incident on the lens;

wherein the first subunit is a directly emitted type subunit having a first light emitting element for emitting light from a vicinity of the focal line of the lens in a direction of the lens for irradiating light to the front side by way of the lens; and wherein the second subunit is a reflecting type subunit including a second light emitting element for emitting light, and a reflector for reflecting light from the second light emitting element to a vicinity of the focal line of the lens for irradiating light to the front side by way of the lens.

(2) The vehicle headlamp according to (1), wherein a light distribution pattern projected from the second subunit to the front side by way of the lens is diverged in a vertical direction more than a light distribution pattern projected from the first subunit to the front side by way of the lens.

(3) The vehicle headlamp according to (1) or (2), wherein the first light emitting element and the second light emitting element are arranged on the same board.

(4) The vehicle headlamp according to any one of (1) through (3), wherein the first light emitting element is arranged at a vicinity of the focal line of the lens and above the focal line.

According to the one or more embodiments of the invention, one of the plurality of light source units includes the lens having the focal line extended in the horizontal direction, and the first subunit and the second subunit for making light incident on the lens. The first subunit is the directly emitted type subunit having the first light emitting element for emitting light from the vicinity of the focal line of the lens in the direction of the lens for irradiating light to the front side by way of the lens. Further, the second subunit is the reflecting type subunit having the second light emitting element for emitting light and the reflector for reflecting light from the second light emitting element to the vicinity of the focal line of the lens for irradiating light to the front side by way of the lens.

That is, according to the invention, the first subunit and the second subunit commonly share the single lens and therefore, in comparison with a case of providing respectively separate lenses, a number of parts can be reduced and also spaces of attaching other attaching members of a lens holder and the like can be made common. Therefore, the first subunit and the second subunit can be arranged proximately to each other.

Therefore, a space occupied by a total of the light source unit can be reduced and the light source unit can be downsized.

Further, according to the invention, as "the lens having the focal line extended in the horizontal direction", for example, a cylindrical lens, a toroidal lens or the like can be pointed out. Here, the toroidal lens is a lens having a shape substantially similar to a shape of a surface of a doughnut and is a lens which is provided with a focal line substantially in a circular arc shape and in which radii of curvature of a contour line of a section orthogonal to the focal line and is a contour line of a section in parallel with the focal line differ from each other. The cylindrical lens is a lens having a shape of a cylindrical shape by making the radius of curvature of the contour line of the section in parallel with the focal line infinitive, that is, constituting the contour line by a linear line in the toroidal lens.

Further, according to the embodiments, the light distribution region projected from the second subunit to the front side by way of the lens is diverged in the vertical direction more than the light distribution pattern projected from the first subunit to the front side by way of the lens. This is mainly owing to the difference between the directly emitted type and the reflecting type and various light distribution patterns can be realized even when the single lens is used.

Further, according to the embodiments, the two light emitting elements are arranged on the same board. Therefore, in assembling, the two light emitting elements may be positioned to the single board and may be combined with other member and therefore, assembling performance can be promoted and accuracies of positioning the two light emitting portions can also be promoted by constituting a reference by the single board.

Further, the first light emitting element of the first subunit is arranged at the vicinity of the focal line of the lens and above the focal line. Therefore, light projected to the front side to the front side by way of the lens can be provided with a cutoff line and, for example, a diverging region constituting a portion of a horizontal line at a vicinity of H line needing a clear brightness boundary can be formed.

Other aspects and advantages of the invention will be apparent from the following description and the appended claims.

BRIEF DESCRIPTION OF THE DRAWINGS

FIG. 11 is a view showing a light distribution pattern for high beam formed by the vehicle headlamp of the embodiment.

FIGS. 12(a) to 12(d) illustrate schematic sectional views showing a relationship between the third subunit and a light distribution pattern.

FIGS. 13(a) to 13(d) illustrate other schematic sectional views showing the relationship between the third subunit and the light distribution pattern.

FIG. 16 is a table showing a pattern of controlling to switch ON/OFF by a switch ON/OFF controller.

FIGS. 18(a) to 18(c) illustrate schematic views showing examples of realizing light distribution patterns in AFS.

DETAILED DESCRIPTION OF THE EXEMPLARY EMBODIMENTS

An explanation will be given of exemplary embodiments of a vehicle headlamp according to the invention in reference to the drawings as follows.

Figure 1:
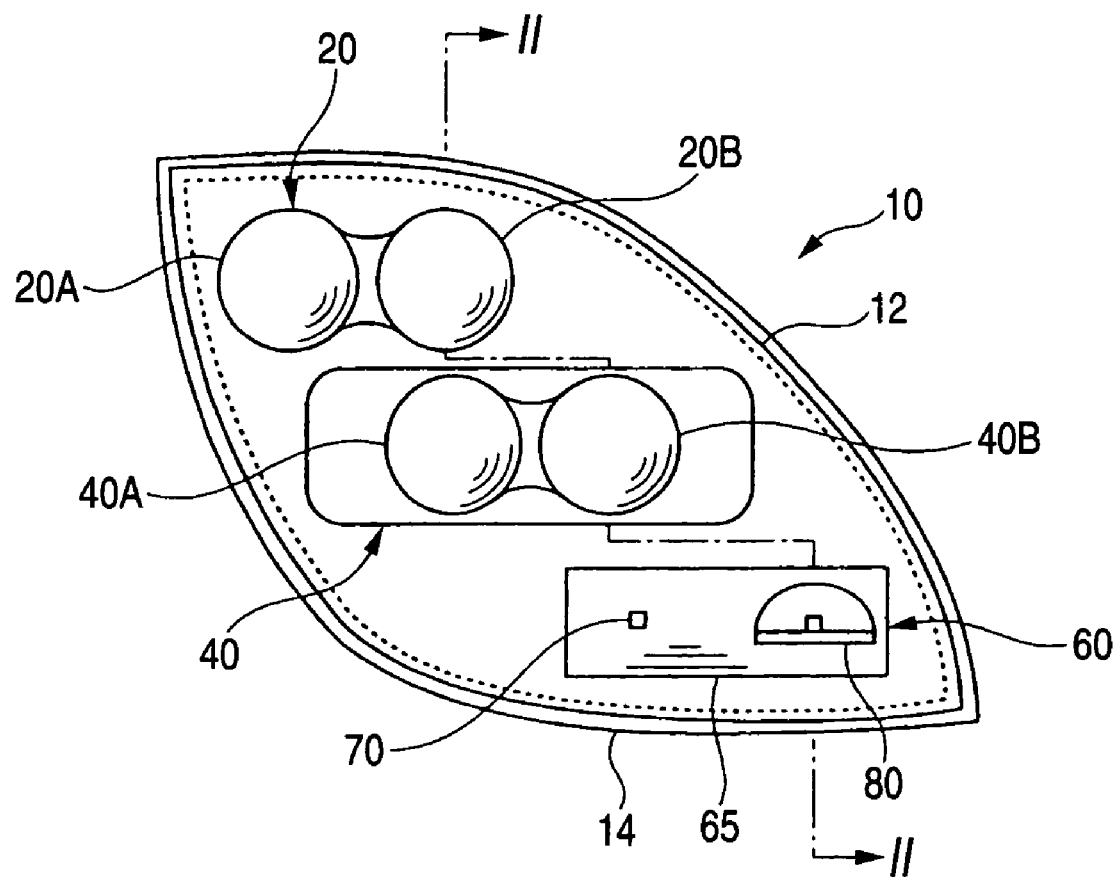
FIG. 1 is a front view showing a vehicle headlamp according to an embodiment of the invention.
Figure 2:
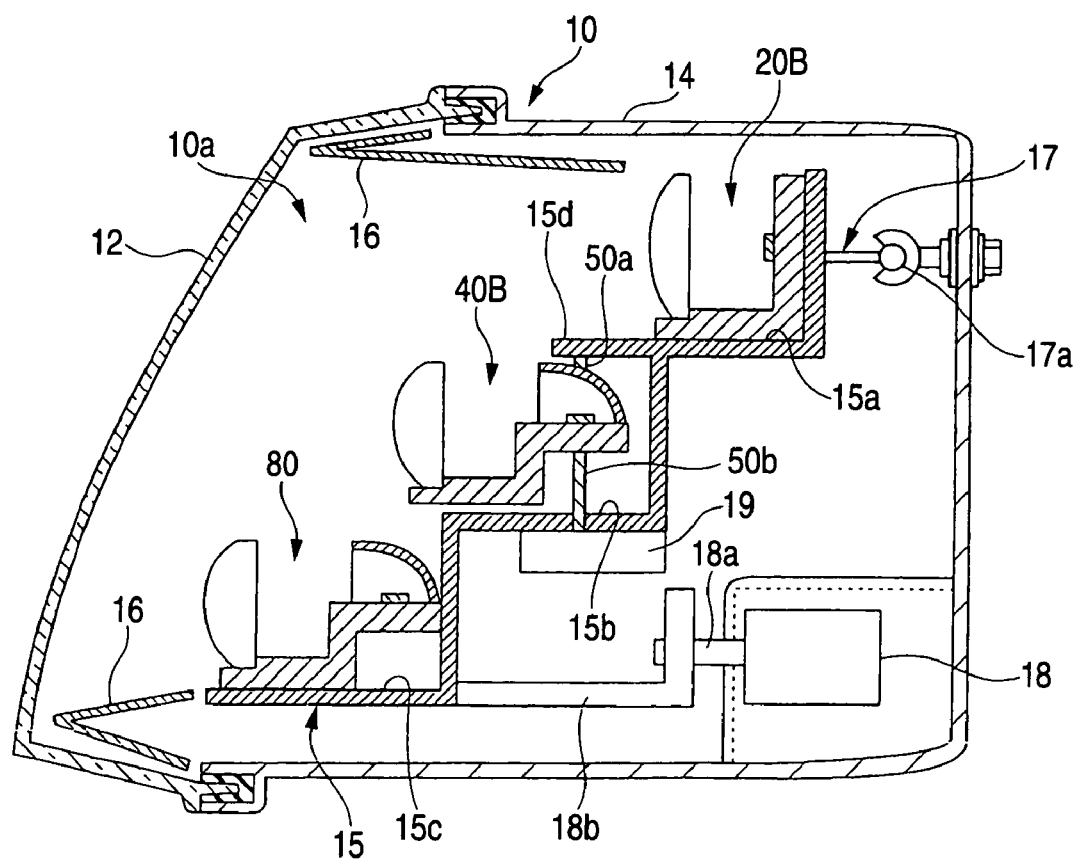
FIG. 2 is a sectional view taken along a line II-II of the vehicle headlamp according to the embodiment.
Figure 3:
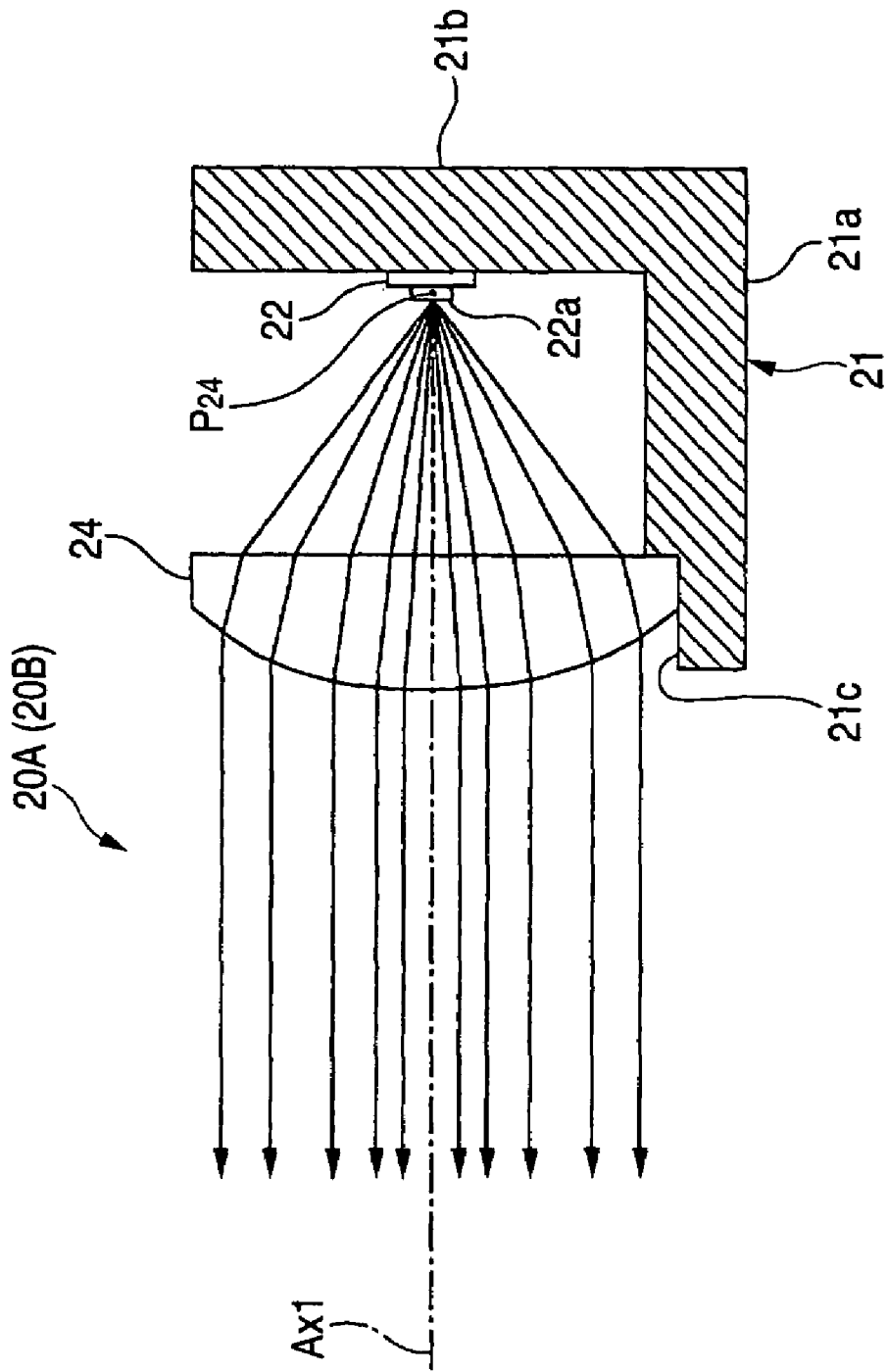
FIG. 3 is a vertical sectional view of a first subunit (second subunit) provided at an upper stage light source unit.
Figure 4:
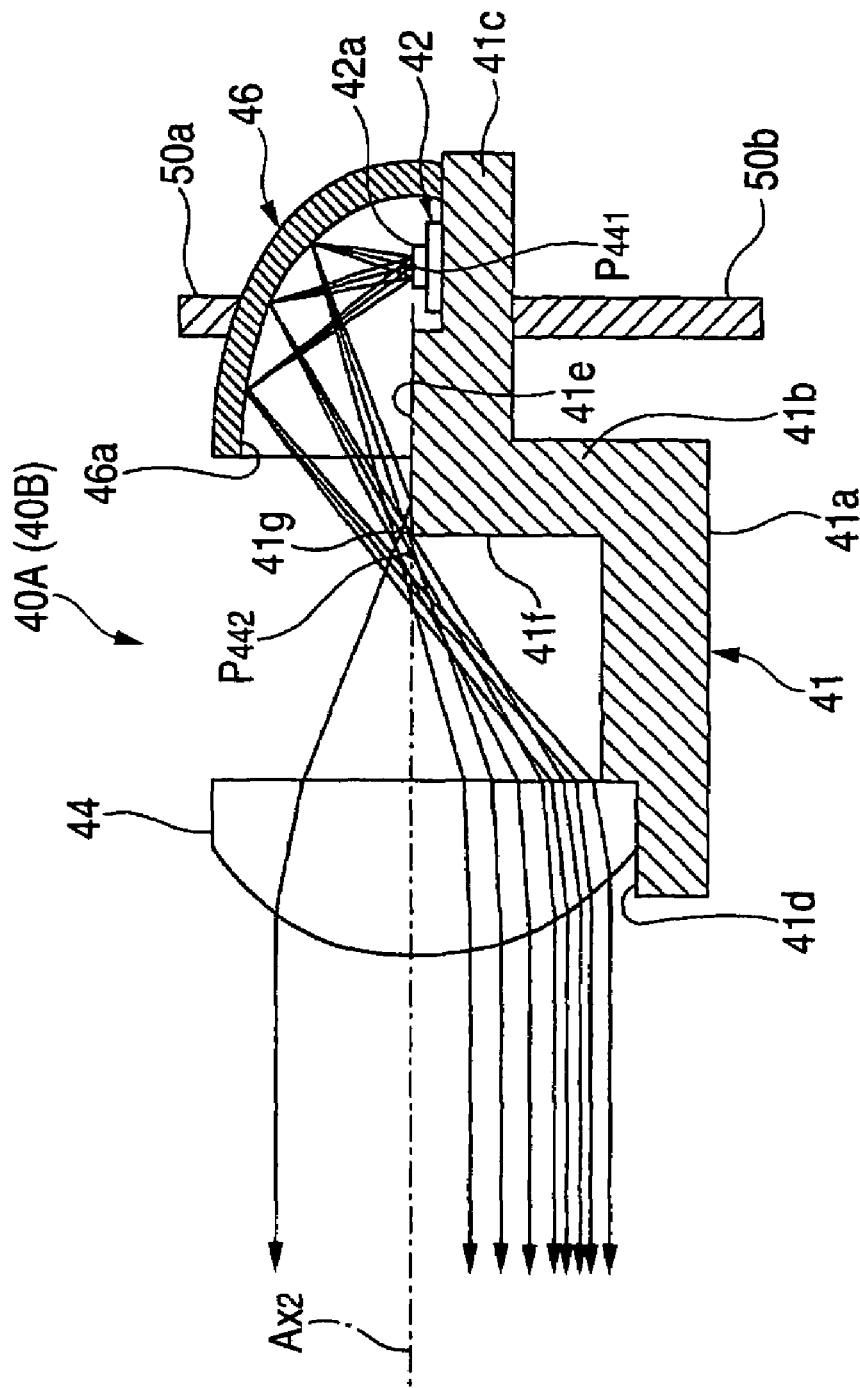
FIG. 4 is a vertical sectional view of a third subunit provided at a middle stage light source unit.
Figure 5:
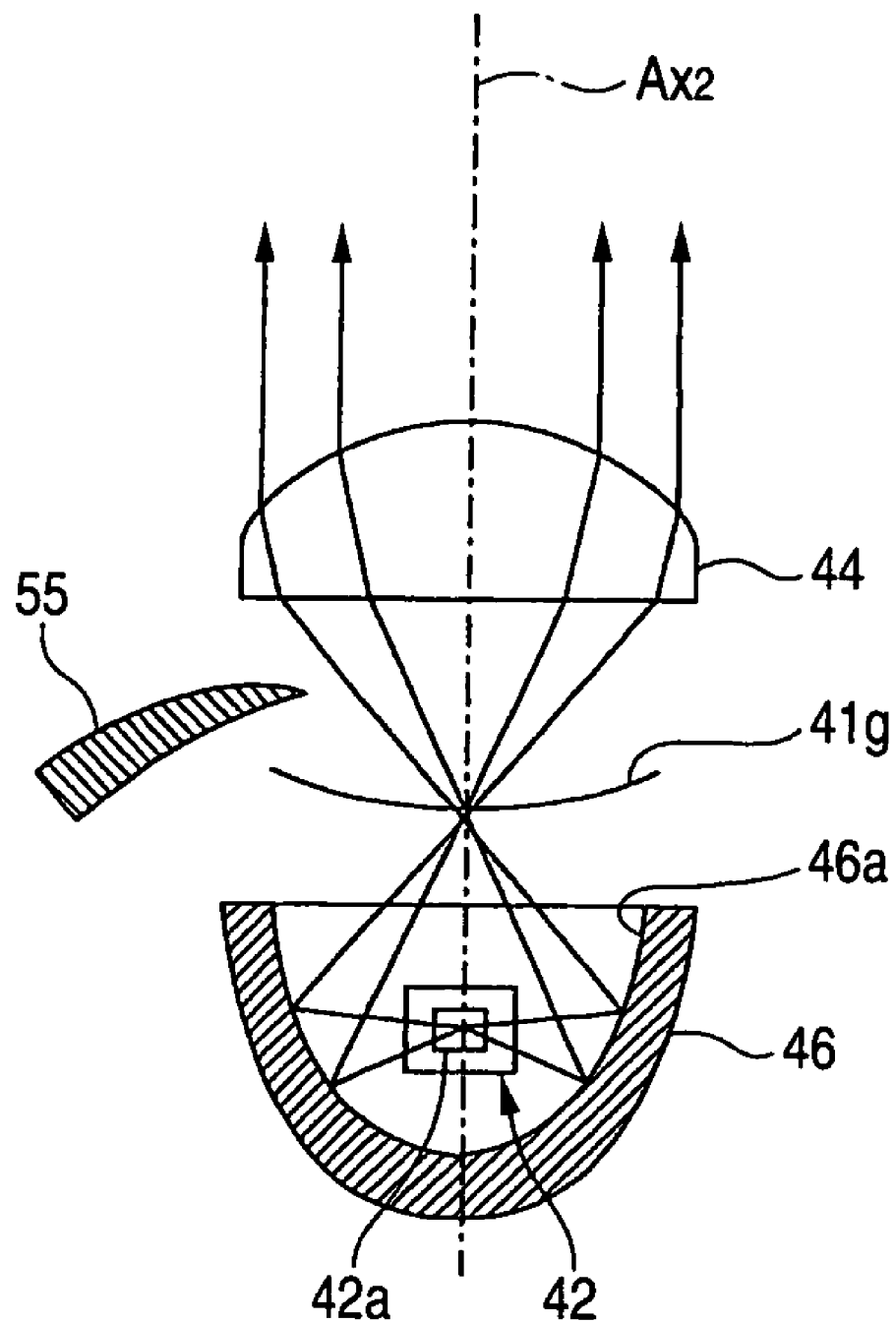
FIGS. 5(a) and 5(b) illustrate horizontal sectional views of the third subunit (fourth subunit).
Figure 5:
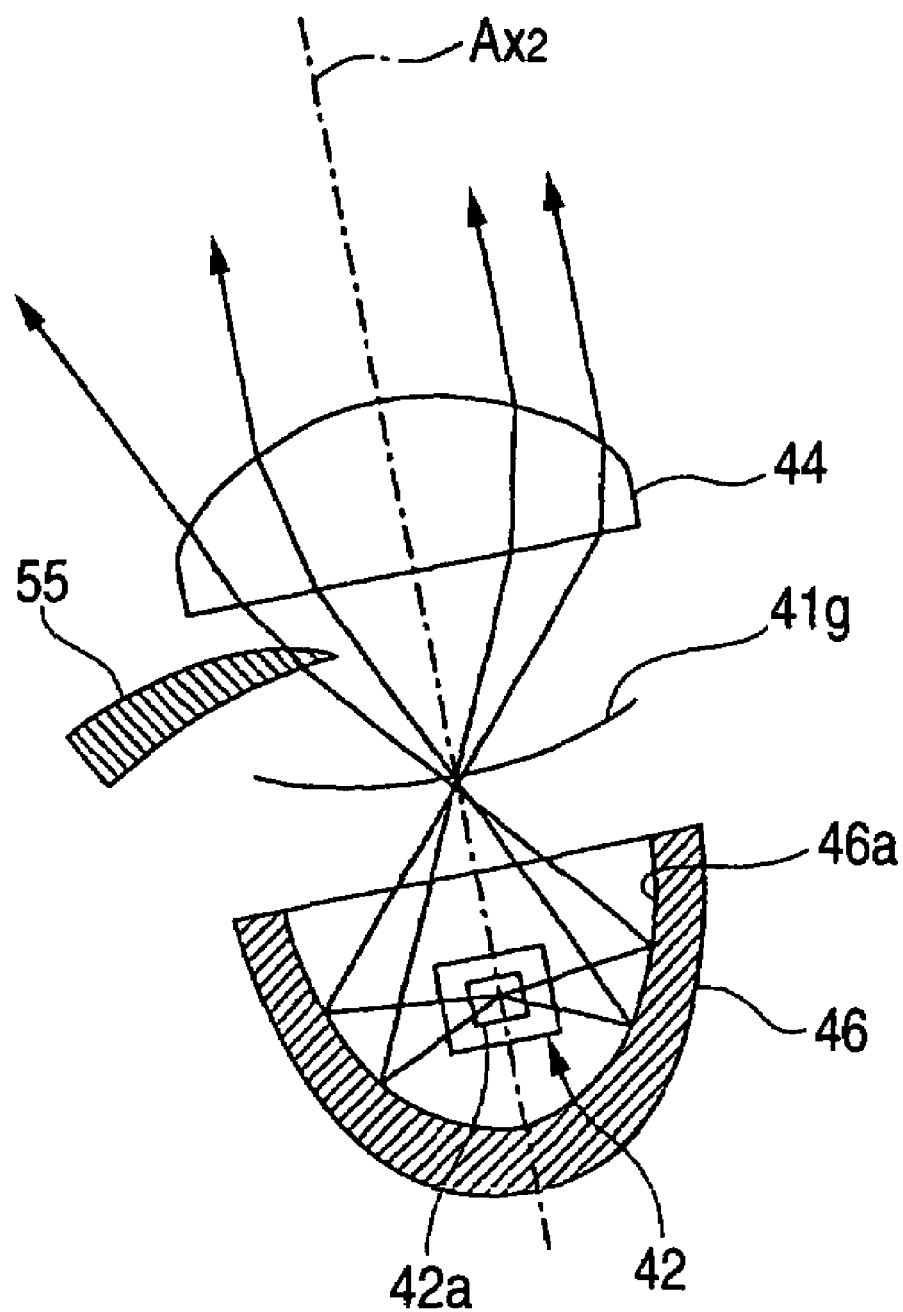
Figure 6:
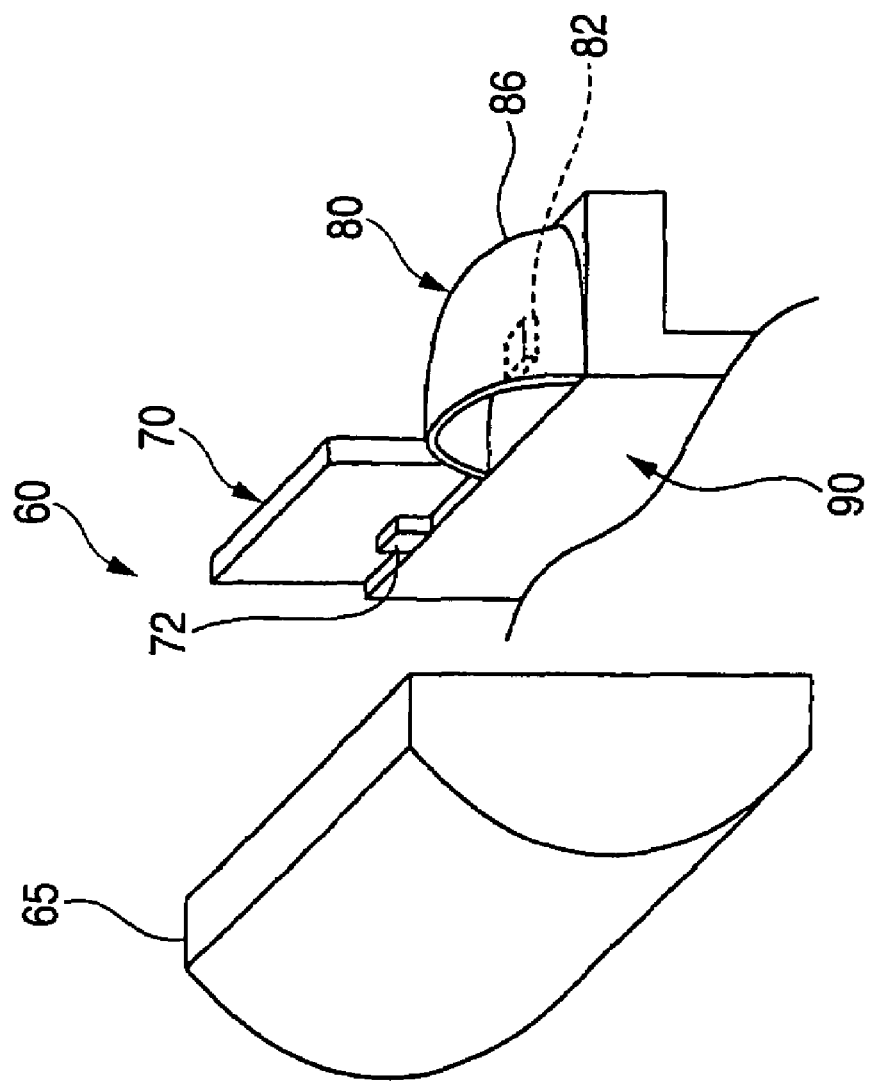
FIG. 6 is a perspective view of a lower stage light source unit.
Figure 7:
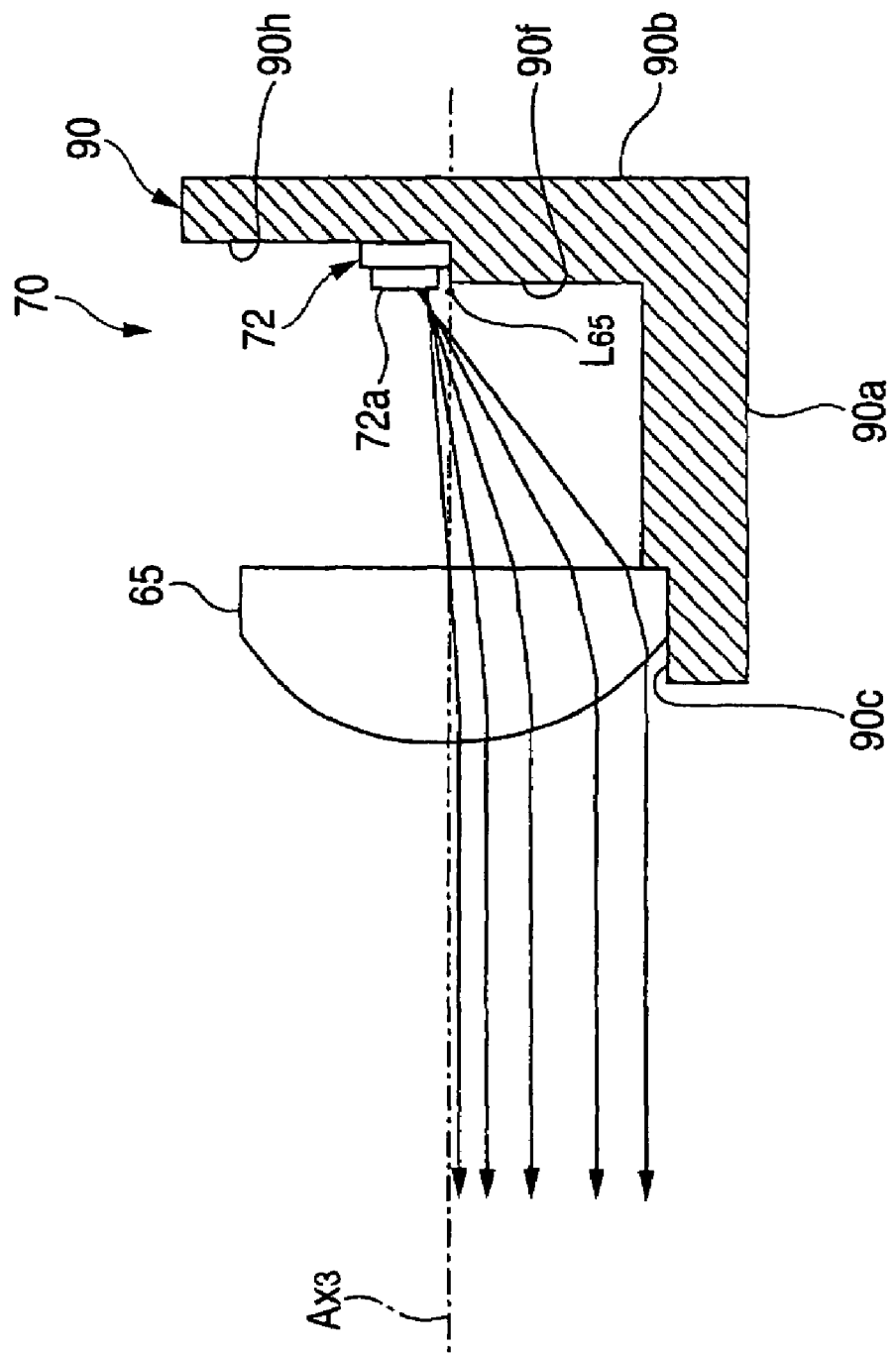
FIG. 7 is a vertical sectional view showing a fifth subunit of the lower stage light source unit.
Figure 8:
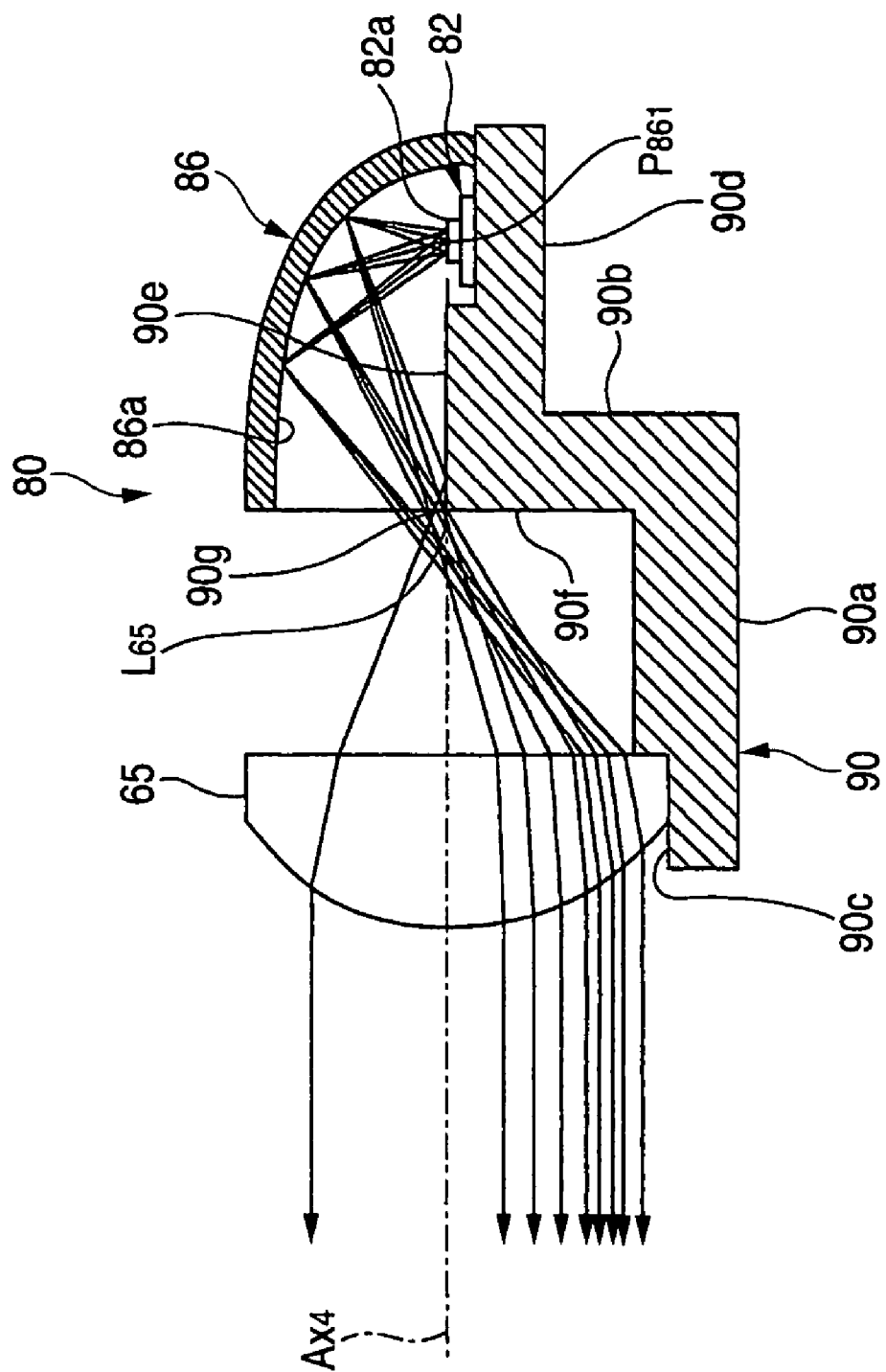
FIG. 8 is a vertical sectional view showing a sixth subunit of the lower stage light source unit.
Figure 9:
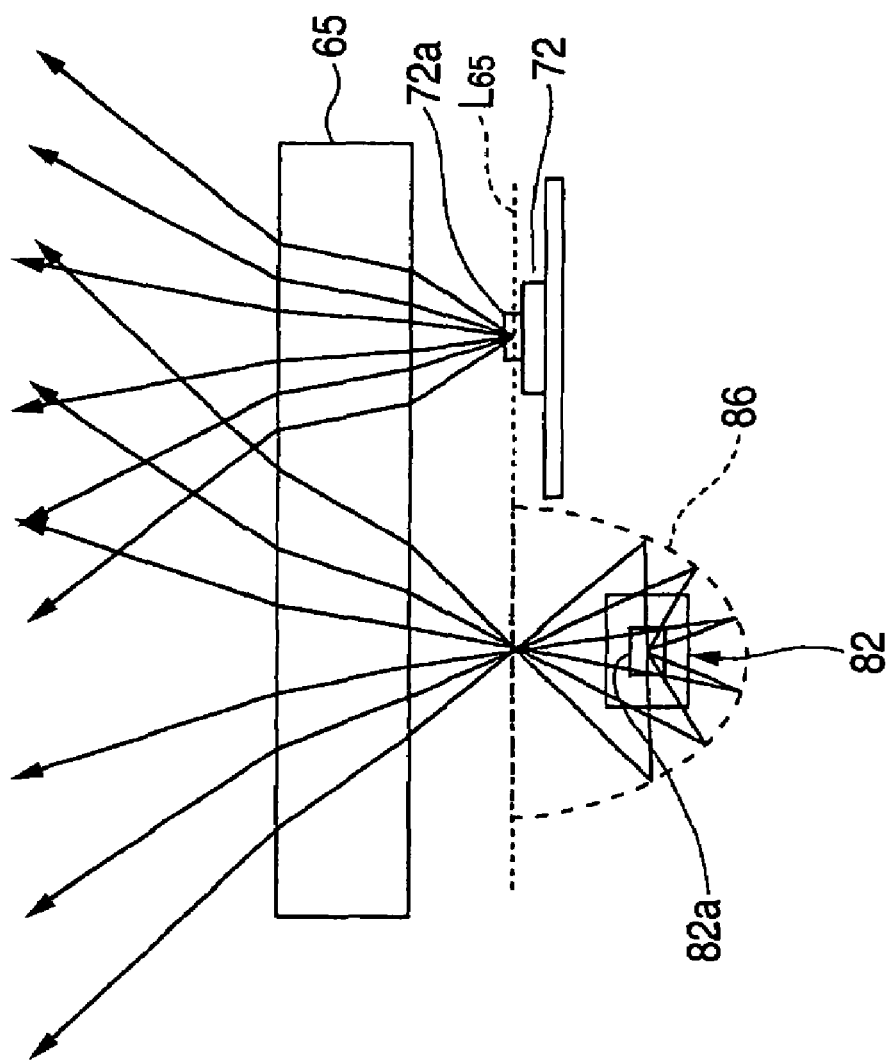
FIG. 9 is a top view of the lower stage light source unit.

FIG. 1 is a front view showing a vehicle headlamp according to the embodiment of the invention. FIG. 2 is a sectional view taken along a line II-II of the vehicle headlamp. FIG. 3 is a vertical sectional view of a first subunit provided at an upper stage light source unit. FIG. 4 is a vertical sectional view of a third subunit provided at a middle stage light source unit. FIGS. 5(a) and 5(b) illustrate horizontal sectional views of the third subunit. FIG. 6 is a perspective view of a lower stage light source unit. FIG. 7 is a vertical sectional view showing a fifth subunit of the lower stage light source unit. FIG. 8 is a vertical sectional view showing a sixth subunit of the lower stage light source unit. FIG. 9 is a top view of the lower stage light source unit.

A vehicle headlamp 10 according to the embodiment is a headlamp attached to, for example, a front end portion of a vehicle, and capable of being switched on and off by selectively switching low beam and high beam. In FIG. 1, as an example, a headlamp unit (headlamp unit) attached to a right front side of a vehicle of an automobile or the like is shown as the vehicle headlamp 10.

As shown by FIG. 1 and FIG. 2, the vehicle head lamp 10 includes a light transmitting transparent cover 12 and a lamp body (lamp member) 14. Further, three of light source units (an upper stage light source unit 20, a middle stage light source unit 40, a lower stage light source unit 60) are fixedly arranged above a support member 15 at inside of a lamp chamber 10a surrounded by the transparent cover 12 and the lamp body 14. Further, an extension 16 is arranged between the three light source units 20, 40, 60 and the transparent cover 12 to cover a gap when viewed from a front side of a lamp piece.

The support member 15 includes three installing portions 15a, 15b, 15c having different heights, which are respectively arranged fixedly with the upper stage light source unit 20, the middle stage light source unit 40, the lower stage light source unit 60 in this order. The support member 15 is fixed to the lamp body 14 by way of a support mechanism 17 inclinable by way of an inclining shaft 17a substantially in parallel with a width direction of a vehicle, and a power transmitting shaft 18b connected to a drive shaft 18a of a motor 18 for leveling constituting an actuator. The support mechanism 17, the motor 18 for leveling and the power transmitting shaft 18b constitute a leveling mechanism for adjusting an angle of attaching the support member 15 to the lamp body 14 in accordance with an output of the motor 14 for leveling. According to the embodiment, optical axes of the respective light source units 20, 40, 60 can be adjusted by adjusting the angle of attaching the support member 15 by way of the leveling mechanism.

Next, the respective light source units 20, 40, 60 will be explained.

According to the embodiment, the respective light source units 20, 40, 60 are light source units respectively having different roles in respectively forming light distribution patterns and constituted to realize various light distribution patterns by selectively switching on and off the respective light source units 20, 40, 60.

First, the upper stage light source unit 20 will be explained as follows.

The upper stage light source unit 20 is a light source unit for forming a light distribution for high beam and includes a pair of a first and a second subunit 20A, 20B respectively having the same constitution as shown by FIG. 1. The first and the second subunits 20A, 20B are installed to align in a width direction at a topmost stage of the installing portion 15a of the support member 15. Further, the first and the second subunits 20A, 20B may be formed as the pair or may be formed separately.

As shown by FIG. 3, the first subunit 20A (similar to the second subunit 20B) includes a metal made base member 21 having substantially an L-like shape in a sectional view thereof, LED (semiconductor light emitting element) 22 as a light source, and a projecting lens 24.

The base member 21 is arranged on the installing portion 15a of the support member 15 at a base member portion 21a thereof extended in a front and rear direction of a vehicle, and LED 22 is fixedly arranged to a vehicle front side of an erected portion 21b erected from the installing portion 15a.

LED 22 is a white light emitting diode having a light emitting portion (light emitting chip) 22a having a size of about 1 mm square and is arranged with a light emitting portion 22a for emitting light in a state of being directed to a vehicle front face side.

The projecting lens 24 is an aspherical lens of a convex lens type for projecting light emitted from the light emitting portion 22a of LED 22 to a vehicle front side and is fixed to the base member 21 at a vicinity of a vehicle front side front end portion 21c of the base member portion 21a. According to the embodiment, a focal point $P_{24}$ of the projecting lens 24 is constituted to substantially coincide with the light emitting portion 22a of LED 22. Therefore, light emitted from the light emitting portion 22a of LED 22 is directly incident on the projecting lens 24 and incident light is projected to the front side along an optical axis Ax1 as substantially parallel light. That is, the first and the second subunits 20A, 20B of the light source unit 20 of the embodiment respectively constitute projector type light source units of a directly emitted type.

Next, the middle stage light source unit 40 will be explained.

The middle stage light source unit 40 is a light source unit for forming a portion of a light distribution for low beam, and includes a pair of a third and a fourth subunit 40A, 40B respectively having the same constitution as shown by FIG. 1. The third and the fourth subunits 40A, 40B are installed to align in a width direction at a middle stage of the installing portion 15b of the support member 15. Further, according to the embodiment, the third and the fourth subunits 40A, 40B are respectively formed by separate members.

As shown by FIG. 4, the third subunit 40A (similar to the fourth subunit 40B) includes, for example, a base member 41 substantially in an L-like shape, LED (semiconductor light emitting element) 42 as a light source, a projecting lens 44, a reflector 46.

The base member 41 includes a base member portion 41a extended in the front and rear direction of the vehicle, and an erected portion 41b is erected from the base member portion 41a, and an optical mounting portion 41c for fixedly mounting LED 42 and the reflector 46 is extended by being folded from the erected portion 41b to a rear side of the vehicle.

LED 42 is a white diode similar to LED 22 and is mounted on a mounting face 41e of the mounting portion 41c in a state of directing a light emitting portion 42a thereof substantially in a vertical upper direction. Further, the light emitting portion 42a may be constituted to be arranged with more or less angle in accordance with a shape of the light emitting portion or a light distribution irradiated to a front side.

The reflector 46 is a reflecting member formed with a reflecting face 46a having a vertical sectional shape substantially in an elliptical shape and having a horizontal sectional shape in a shape of a free curved face based on an ellipse. The reflector 46 is designed and arranged such that a first focal point $P_{441}$ thereof is disposed at a vicinity of the light emitting portion 42a of LED 42 and a second focal point $P_{442}$ thereof is disposed at a vicinity of a brow line 41g made by the mounting face 41e of the mounting portion 41c and a front face 41f of the erected portion 21b.

Light emitted from the light emitting portion 22a of LED 22 is reflected by the reflecting face 46a of the reflector 46 and is incident on the projecting lens 44 by passing a vicinity of the second focal point $P_{442}$. Further, the third and the fourth subunits 40A, 40B are constituted such that a skewed cutoff line is formed at a light distribution pattern projected to the front side of the vehicle by selectively cutting light by reflecting a portion of light by the mounting face 41e by constituting a boundary line by the brow line 41g made by the mounting face 41e of the mounting portion 41c and the front face 41f of the erected portion 21b. That is, the brow line 41g constitutes a brightness boundary line of the third and the fourth subunits 40A, 40B. Further, it is preferable that also a portion of light reflected by the reflecting face 46a of the reflector 46 and further reflected by the mounting face 41e is irradiated to the front side as effective light. Therefore, according to the embodiment, the vehicle front side of the mounting face 41e is provided with an optical shape in which an angle of reflection thereof is set pertinently in consideration of a positional relationship between the projecting lens 44 and the reflector 46.

The projecting lens 44 is an aspherical lens of a convex lens type for projecting light reflected by the reflecting face 46a of the reflector 46 to the vehicle front side, and is fixed to the base member 41 at a vicinity of the vehicle front side front end portion 41c of the base member portion 41a. According to the embodiment, a focal point of the projecting lens 44 is constituted to substantially coincide with the second focal point $P_{442}$ of the reflector 46. Therefore, light incident on the projecting lens 44 by being reflected by the reflector 46 is projected to the front side as substantially parallel light. That is, the third and the fourth subunits 40A, 40B of the light source unit 40 of the embodiment respectively constitute projector type light source units of a reflecting type for forming to cut converged light.

Further, according to the embodiment, the third and the fourth subunits 40A, 40B are fixed to the support portion 15d and the installing portion 15b respectively pivotably by way of pivoting shafts 50a, 50b. The pivoting shaft 50b on one side is connected to an actuator 19, the third and the fourth subunits 40A, 40B are swiveled in a left and right direction respectively independently from each other by constituting axes thereof by the pivoting shaft 50a, 50b by a drive force of the actuator 19 to make directions of optical axes thereof variable although a description will be given thereof later in details. That is, the third and the fourth subunits 40A, 40B respectively constitute optical axes variable light source units capable of changing the directions of the optical axes independently from other light source unit.

Specifically, the third and the fourth subunits 40A, 40B can change optical axes Ax2 such that an irradiating position in a horizontal direction is changed as shown by FIG. 5(b) from a front face (state of being directed in 0° direction) as shown by FIG. 5(a). Thereby, a position of a light converging region can be changed between a center of a front side of the vehicle and a side of the front side of the vehicle. Therefore, for example, a direction of the optical axis Ax2 is changed and light is irradiated to the side of the front side of the vehicle by being pivoted by constituting the axis by the pivoting shafts 50a, 50b in the horizontal direction in accordance with a side in a turning direction in turning the vehicle or the like. Thereby, optical recognizability in a direction of advancing the vehicle can be promoted.

Further, according to the embodiment, a diverging ember 55 is provided at least on one side (left side in the drawing) of sides of a region between the projecting lens 44 and the brown line 41g, that is, between the projecting lens 44 and the reflector 46. According to the embodiment, the diverging member 55 diverges light emitted from the light source and reflected by the reflector 46 further in a side direction. The diverging member 55 may be arranged only on one side or may be arranged on both sides. When arranged only on one side, it is preferable to provide the diverging member on a side of arranging the vehicle headlamp 10 on the front side of the vehicle, that is, right side when arranged on the right side of the vehicle, or left side when arranged on the left side of the vehicle.

The diverging member 55 of the embodiment is a prism diverging lens in which a wall thickness thereof along the front and the rear direction of the vehicle, that is, a direction of propagating light is thickened as being remote from the optical axis Ax2. The diverging member 55 is fixed to the lamp body 14 or the support member 15 by way of a fixed member, not illustrated, at a position on which light is not incident when the third and the fourth subunits 40A, 40B each is directed to the front side (state of being directed in 0° direction). On the other hand, when the optical axis Ax2 is changed to change the irradiating position in the horizontal direction as shown by FIG. 5(b), a portion of light is incident on the diverging member 15, and light is diverged in a side direction. Thereby, a light amount irradiated in the side direction is increased and side optical recognizability can further be promoted.

Next, the lower stage light source unit 60 will be explained.

The lower stage light source unit 60 is a light source unit for forming a portion of the light distribution for low beam and includes two of a fifth and a sixth subunit 70, 80 respectively having different constitutions, and one cylindrical lens 65. The fifth and the sixth subunits 70, 80 are installed to align in a width direction at a lowermost stage of the installing portion 15c of the support member 15.

As shown by FIG. 6, the fifth and the sixth subunits 70, 80 include a base member 90 as a common base member. The fifth subunit 70 is constituted by arranging LED 72 on the base member 90, and the sixth subunit 80 is constituted by including LED 82 and a reflector 86 on the base member 90. Further, the single cylindrical lens 65 is arranged on front sides of the fifth and the sixth subunits 70, 80 in the front and rear direction of the vehicle. According to the embodiment, the cylindrical lens 65 is constituted as a projecting lens commonly shared by the two subunits 70, 80.

According to the base member 90, as shown by FIG. 7, a base member portion 90a extended in the front and rear direction of the vehicle is arranged on the installing portion 15c of the support member 15, and an erected portion 90b is erected from the base member portion 90a. A stepped difference portion 90h is formed by cutting off a portion of an upper side of the erected portion 90b, and LED 72 is mounted to a vehicle front side of the stepped difference portion 90h. According to the embodiment, the fifth subunit 70 is constituted by LED 72.

LED 72 is a white diode similar to LED 22, and a light emitting portion 72a is fixedly arranged on the stepped difference portion 90h in a state of being directed to the front side in the front and rear direction of the vehicle. Further, the light emitting portion 72a may be constituted to be arranged with more or less angle in accordance with a shape of the light emitting portion and the light distribution irradiated to the front side.

The cylindrical lens 65 is a lens having substantially a cylindrical shape for projecting light emitted from the light emitting portion 72a of LED 62 to the front side of the vehicle and is fixed to the base member 90 at a vicinity of a vehicle front side front end portion 90c of the base member portion 90a. The cylindrical lens 65 is provided with a single piece of a focal line $L_{65}$ and is constituted such that the focal line $L_{65}$ is disposed at a vicinity of a lower end of the light emitting portion 72a of LED 72 as shown by FIG. 7. Therefore, light emitted from the light emitting portion 72a of LED 72 is directly incident on projecting lens 65 to project a light distribution pattern including a cutoff line in correspondence with the focal line $L_{65}$ to the front side along an optical axis Ax3 by constituting substantially parallel light by incident light. That is, the fifth subunit 70 of the embodiment constitutes a projector type light source unit of a directly emitted type.

On one side in the width direction of the vehicle of the base member 90, a portion of the erected portion 90e is folded to bend to a rear side of the vehicle, a mounting portion 90c for mounting to fix LED 82 and the reflector 86 is extended, thereby, the sixth subunit 80 is integrally formed contiguously to the fifth subunit 70.

LED 82 is a white diode similar to LED 22, and a light emitting portion 82a thereof is mounted on a mounting face 90e of the mounting portion 90c in a state of being directed substantially in a vertical upper direction. Further, the light emitting portion 82a may be constituted to arrange with more or less angle in accordance with a shape of the light emitting portion and a light distribution pattern irradiated to the front side.

The reflector 86 is a reflecting member formed with a reflecting face 86a having a vertical sectional shape substantially in an elliptical shape and a horizontal sectional shape in a free curved face constituting a reference by an ellipse on an inner side thereof. The reflector 86 is designed and arranged such that a first focal point $P_{861}$ thereof is disposed at a vicinity of a light emitting portion 82a of LED 82, and a second focal point is disposed at a vicinity of a brow line 90g made by the mounting face 90e of the mounting portion 90c and a front face 90f of the erected portion. According to the embodiment, a positional relationship with the cylindrical lens 65 is set such that a focal line L₆₅ of the cylindrical lens 65 is arranged at a vicinity of the brow line 90g made by the mounting face 90e of the mounting portion 90c and the front face 90f of the erected portion 90b.

Therefore, light emitted from the light emitting portion 22a of LED 22 is reflected by the reflecting face 86a of the reflector 86 and is incident on the cylindrical lens 65 by passing a vicinity of the focal line L₆₅. Light incident on the cylindrical lens 65 is projected to a front side along an optical axis Ax4 by constituting substantially parallel light in the vertical direction.

Further, the sixth subunit 80 is constituted to form a cutoff line in a light distribution pattern projected to the front side of the vehicle by selectively cutting light by reflecting a portion of light by the mounting face 90e by constituting a boundary line by the mounting face 90e of the mounting portion 90c and the front face 90f of the erected portion 90b. Further, it is preferable that also a portion of light reflected by the reflecting face 86a of the reflector 86 and further reflected by the mounting face 90e is irradiated to the front side as effective light. Therefore, according to the embodiment, the vehicle front side of the mounting face 90e is provided with an optical shape for pertinently setting an angle of reflection in consideration of a positional relationship between the cylindrical lens 65 and the reflector 86.

On the other hand, as shown by FIG. 9, with regard to the width direction of the vehicle, light reflected by the reflecting face 86a of the reflector 86 is incident on the cylindrical lens 65 in a state of being diverged without particularly changing an advancing direction. Therefore, with regard to the width direction of the vehicle, light emitted from the sixth subunit 80 becomes diverged light. In this way, the sixth subunit 80 of the embodiment constitutes a projector type light source unit of a reflecting type.

In this way, according to the lower stage light source unit 60 of the embodiment, the fifth subunit 70 and the sixth subunit 80 commonly share the same cylindrical lens 65. Therefore, a number of parts can be reduced in comparison with that in the case of respectively providing the lenses, also spaces of attaching the lens holder, other attaching member and the like can be made to be common and therefore, the fifth subunit 70 and the sixth subunit 80 can be arranged to be proximate to each other. Therefore, the lower stage light source unit 60 can be downsized by reducing a space occupied by a total of the lower stage light source unit 60.

Next, an explanation will be given of a basic light distribution pattern formed by the head lamp 10 of the embodiment in reference to FIG. 10 and FIG. 11. The vehicle headlamp 10 of the embodiment can form a light distribution pattern LP for low beam and a light distribution pattern HP for high beam as basic light distribution patterns.

Figure 10:
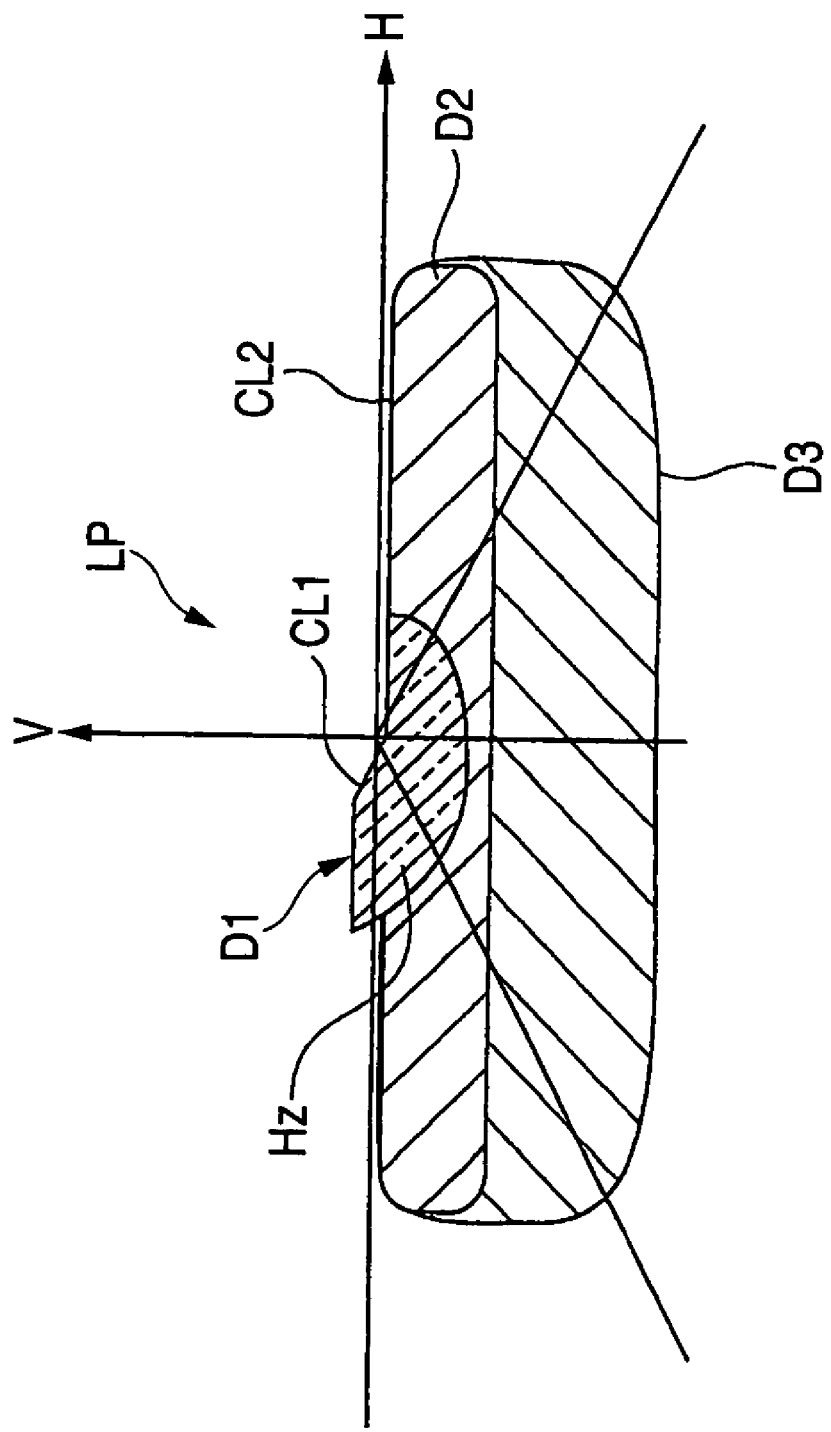
FIG. 10 is a view showing a light distribution pattern for low beam formed by the vehicle headlamp of the embodiment.

FIG. 10 is a diagram showing the light distribution pattern LP for low beam formed by the vehicle headlamp 10 of the embodiment.

The light distribution pattern LP for low beam is formed by switching on the middle stage light source unit 40 and the lower stage light source unit 60.

Specifically, by switching on the third and fourth subunits 40a, 40b of the middle stage light source unit 40, light is irradiated to a narrow first region D1 at a vicinity of an intersection of H-V lines on a front side of a front face of the vehicle. The first region D1 includes a cutoff line CL1 substantially in a Z-like shape formed in correspondence with the blow lines 41g formed at the third, the fourth subunit 40a, 40b. Further, a region downward from the cutoff line CL1 is set as a hot zone Hz having a high light amount in the first region D1.

Further, by switching on the fifth, the sixth subunits 70, 80 of the lower stage light source unit 60, a second region D2 and a third region D3 extended in a width direction of the vehicle (H line direction) are formed respectively downward from the first region D1.

The second region D2 formed by the fifth subunit 70 is formed at a downward vicinity of the first region D1 to partially overlap the first region D1. An upper end of the second region D2 is formed with a cutoff line CL2 formed by the fifth subunit 70. According to the embodiment, the cutoff line CL2 is set to be projected to the front side to be continuous to the cutoff line CL1 of the first region D1.

Further, the third region D3 formed by the sixth subunit 80 is formed downward from the second region D2 to partially overlap the second region D2. Since the sixth subunit 80 is the reflecting type projector light source unit, light is irradiated in a wide direction in the vertical direction more easily than the sixth subunit 70 constituting the directly emitted type projector light source unit. Therefore, according to the embodiment, there is constructed a constitution of forming the third region D3 as a short distance diverging region for promoting short distance optical recognizability by the sixth subunit 80 and forming the second region D2 as a long distance diverging region for promoting long distance optical recognizability by the fifth subunit 70.

In this way, according to the embodiment, the light distribution pattern LP for low beam is formed by combining the first region D1, the second region D2 and the third region D3 formed by the middle stage light source unit 40 and the lower stage light source unit 60.

FIG. 11 is a diagram showing the light distribution pattern HP for high beam formed by the vehicle headlamp 10 of the embodiment.

The light distribution pattern HP for high beam is formed by switching on the middle stage light source unit 40 and the lower stage light source unit 60 as well as the upper stage light source unit 20.

Specifically, there is constructed a constitution in which by switching on the upper stage light source unit, a fourth region D4 is irradiated overlappingly on the first region D1, the second region D2 and the third region D3 formed by the middle stage light source unit 40 and the lower stage light source unit 60. The fourth region D4 is a light distribution pattern diverged in an up and down direction and in a left and right direction centering on a vicinity of an intersection of H-V lines. According to the light distribution pattern HP for high beam, a light amount of a total is increased by forming the fourth region D4 to thereby promote remote optical recognizability.

Further, according to the embodiment, in forming the light distribution pattern HP for high beam, there is constructed a constitution of further promoting remote optical recognizability by arranging the hot zone Hz at a vicinity in a horizontal direction 0° by respectively shifting the optical axes Ax2 slightly (0.5 through 5°) in the right direction by pivoting the middle stage light source units 40a, 40b of the middle stage light source unit 40.

Next, an explanation will be given of a relationship between pivoting movement of the third, the fourth subunits 40a, 40b of the middle stage light source unit 40 according to the embodiment and the light distribution pattern in reference to FIG. 12 and FIG. 13.

FIGS. 12(a) to 12(d) illustrate schematic sectional views showing a relationship between the third subunit 40a and the light distribution pattern. Specifically, FIG. 12(a) is a schematic horizontal sectional view when the third subunit 40a (the same also in the case of the fourth subunit 40b) is pivoted in a left direction by 15° in a case of a constitution of not arranging the diverging member 55, and FIG. 12(b) is a schematic diagram showing the light distribution pattern. Further, FIG. 12(c) is a schematic horizontal sectional view when the third subunit 40a is pivoted in the left direction by 15° in a case of a constitution of being arranged with the diverging member 55, and FIG. 12(d) is a schematic diagram showing the light distribution pattern. In FIGS. 12(a) to 12(d), a prism diverging lens is used as the diverging member 55.

As is known by comparing FIG. 12(a) and FIG. 12(c), when the diverging member 55 is arranged, in a state of pivoting the third subunit 40a, a portion of light is incident on the diverging member 55 immediately before being incident on the projecting lens 44 and a direction of advancing light is bent to a pivoting side. Therefore, light emitted from the projecting lens 44 is diverged more in a side direction when the diverging member 55 is arranged.

When the specific light distribution patterns are compared, whereas in the light distribution pattern D11 shown in FIG. 12(b), a rise position of the cutoff line is inclined by 15° the same as the pivoting angle, in the light distribution pattern D12 shown in FIG. 12(d), a rise position of the cut offline is inclined by 20° larger than the pivoting angle by 5°. This is because light is diverged in the side direction by the diverging member 55. As a result, it is known that a total of the light distribution pattern is diverged to extend in the vehicle width direction.

FIGS. 13(a) to 13(d) illustrate other schematic sectional views showing the relationship between the third subunit 40a and the light distribution pattern.

Specifically, FIG. 13(a) is a schematic horizontal sectional view when the third subunit 40a is pivoted in the left direction by 20° in a case of a constitution of not arranging the diverging member 55, and FIG. 13(b) is a schematic diagram showing the light distribution pattern. Further, FIG. 13(c) is a schematic horizontal sectional view when the subunit 40a is pivoted in the left direction by 20° in a case of a constitution of arranging the diverging member 55, and FIG. 13(d) is a schematic diagram showing the light distribution pattern. In FIGS. 13(a) to 13(d), there is used a step diverging lens formed with a plurality of cylindrical steps 55a on the reflector side as the diverging member 53.

As is known by comparing FIG. 13(a) and FIG. 13(c), when the diverging member 55 is arranged, in a state of pivoting the third subunit 40a, a portion of light is incident on the diverging member 55 immediately before being incident on the projecting lens 44 and a direction of advancing light is bent to the pivoting side. Therefore, light emitted from the projecting lens 44 is more diverged in the side direction when the diverging member 55 is arranged. Further, when the step diverging lens is used as the diverging member 55, a portion of light is bent also in a direction reverse to the pivoting side, as a result, light is diverged in both of left and right directions.

When the specific light distribution patterns are compared, whereas according to a light distribution pattern D13 shown in FIG. 13(b), a rise position of the cutoff line is inclined by 20° the same as the pivoting angle, according to a light distribution pattern D14 shown in FIG. 13(d), a rise position of the cutoff line is inclined by 15° smaller than the pivoting angle by 5°. Further, as shown by FIG. 13(d), a region of the light distribution pattern D14 is extended considerably to left side by about 35°. This is because light is diverged both in left and right directions by the diverging member 55. As a result, it is known that a total of the light distribution pattern is diverged to extend in the vehicle width direction.

In this way, when the diverging member 55 is arranged, light is diverged and therefore, the light distribution pattern can be shifted in the side direction by the pivoting angle or more. Therefore, even in a case of an arrangement restricting amounts of pivoting the third, the fourth subunits 40a, 40b, the diverging member 55 can diverged to irradiate light in the side direction by the pivoting angle or more. Conversely, the pivoting amount can be made to be small in comparison with an amount of shifting the light distribution pattern and therefore, the total of the light source unit can be made to be compact by reducing a space for pivoting. Further, since the pivoting amount is small, actuators for driving the third, the fourth subunits 40a, 40b can also be downsized.

Figure 14:
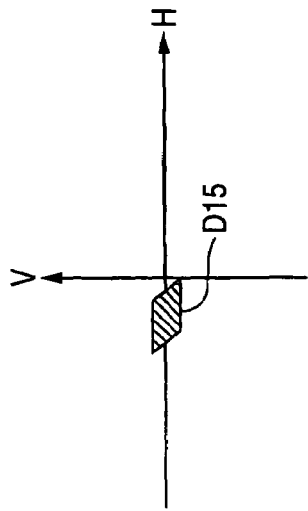
FIGS. 14(a) to 14(h) illustrate views showing a relationship between pivoting movement and a light distribution pattern when a diverging member is provided at a light source unit of a directly emitted type.
Figure 14:
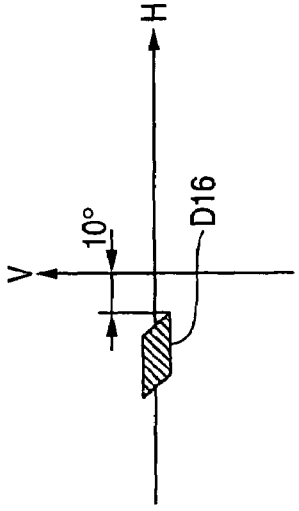
Figure 14:
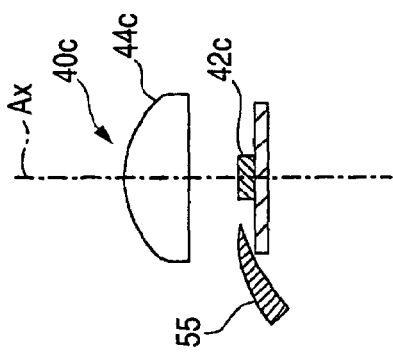
Figure 14:
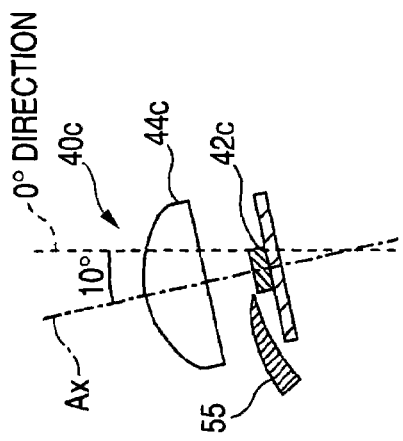
Figure 14:
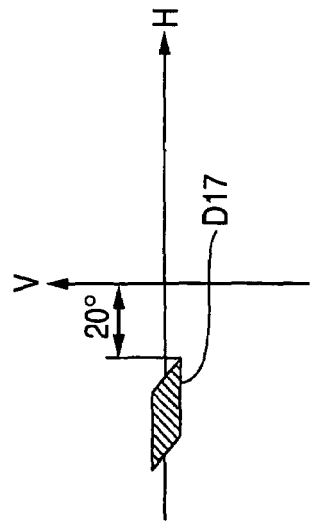
Figure 14:
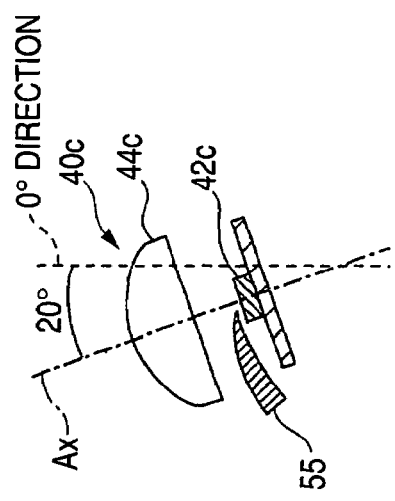
Figure 14:
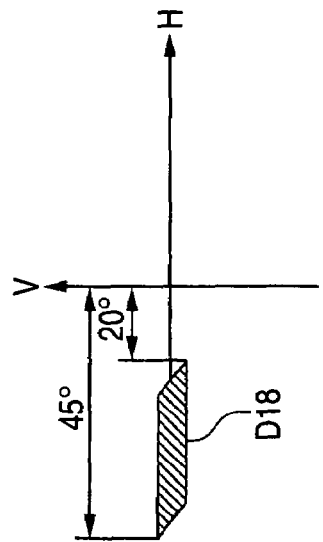
Figure 14:
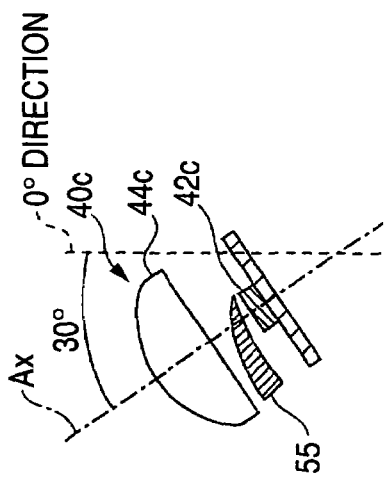

Further, although in the above-described explanation, there is shown a constitution of attaching the diverging members 55 to the third, the fourth subunits 40a, 40b of the reflecting type, the invention is not limited thereto but the middle stage light source unit 40 may be constituted by respectively replacing the third, the fourth subunits 40a, 40b by the light source units 40c of the directly emitted type as shown by FIG. 14.

FIGS. 14(a) to 14(h) illustrate views showing a relationship between the pivoting movement and the light distribution pattern when the diverging member is provided to the directly emitted type light source, FIGS. 14(a) and 14(b) are respectively views showing the light source unit and the light distribution pattern when the pivoting angle is 0°. FIGS. 14(c) and 14(d) are respectively views showing the light source unit and the light distribution pattern when the pivoting angle is 20°. FIGS. 14(e) and 14(f) are respectively views showing the light source unit and the light distribution pattern when the pivoting angle is 20°. FIGS. 14(g) and 14(h) are respectively views showing the light source unit and the light distribution pattern when the pivoting angle is 30°.

The light source unit 40c of the directly emitting type is constructed by a constitution similar to that of the fifth subunit 70 shown in FIG. 7 and is constructed by a constitution of arranging a light emitting portion 40c of LED at a vicinity of a focal point of a projecting lens 40c. Even in the constitution, as shown by FIGS. 14(c) and 14(d), when a total of the unit is inclined by 10°, a total of the light distribution pattern is shifted in the side direction on the left side by 100 and a length in the vehicle width direction (horizontal direction) of the light distribution pattern is extended. The tendency is increased further when the total of the unit is inclined by 20° as shown by FIGS. 14(e) and 14(f), further, it is known that as shown by FIGS. 14(g) and 14(h), when the total of the unit is inclined by about 30° and the diverging member 55 is extended to a degree of crossing the optical axis Ax, the light distribution pattern is extended not only to the left side but also to the right side.

In this way, even in the directly emitted type light source unit, when the diverging member 55 is arranged, light is diverged and therefore, the light distribution pattern can be shifted in the side direction by the pivoting angle or more. Therefore, even in an arrangement of restricting the pivoting amount of the light source unit, the diverging member 55 can diverge to irradiate light in the side direction by the pivoting angle or more. Conversely, the pivoting angle can be reduced in comparison with the amount of shifting the light distribution pattern and therefore, a total of the light source unit can be made to be compact by reducing the space for pivoting. Further, since the pivoting amount is small, the actuator for driving the light source unit can also be downsized.

Next, a detailed explanation will be given of switch ON/OFF of the vehicle headlamp 10 of the embodiment in reference to FIG. 15.

Figure 15:
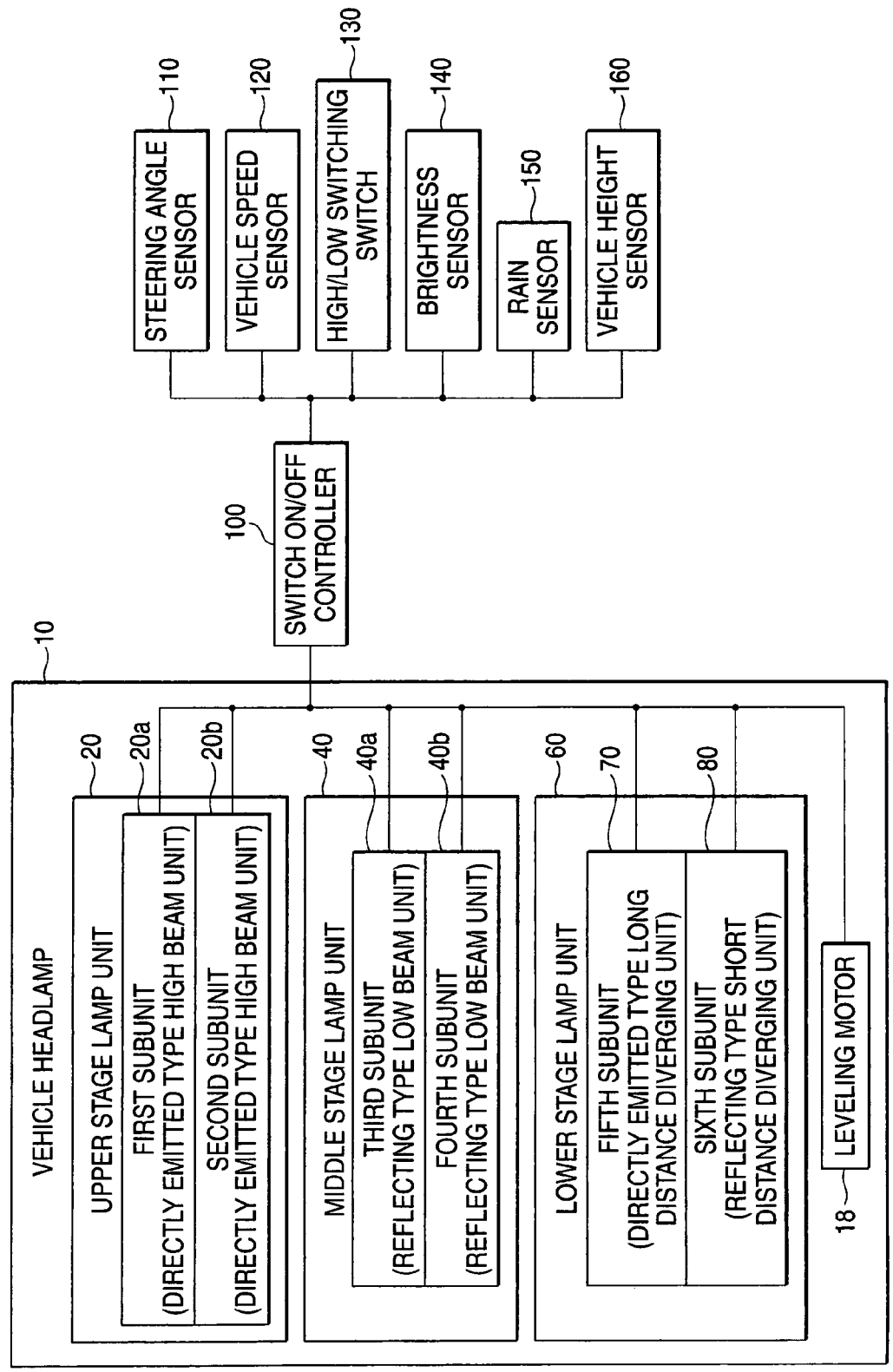
FIG. 15 is a control block diagram showing a control related to the vehicle headlamp of the embodiment and switching ON/OFF thereof.

FIG. 15 is a control block diagram showing a control related to the vehicle headlamp 10 of the embodiment and switch ON/OFF thereof. A switch ON/OFF control of the vehicle headlamp 10 of the embodiment is carried out by a switch ON/OFF controller 100, a steering angle sensor 110, a vehicle speed sensor 120, a high/low switching switch 130, a brightness sensor 140, a rain sensor 150 and a vehicle height sensor 160 for outputting various signals to the switch ON/OFF controller 100. All of these are similarly mounted to a vehicle mounted with the vehicle headlamp 10.

The switch ON/OFF controller 100 is a control center portion for controlling to switch ON/OFF, increase light and reduce light of respectives of the respective light source units 20, 40, 60 of the vehicle headlamp 10, controls respective pivoting angles of the third and the fourth subunits 40a, 40b with regard to the middle stag light source unit 40, and adjusts leveling by controlling the motor 14 for leveling based on outputs from the various sensors and the switch mentioned above. The switch ON/OFF controller 100 is constituted to automatically produce a light distribution adapted to a running situation. That is, according to the embodiment, AFS (Adaptive Front lighting System) is realized by using the vehicle headlamp 10.

Next, the sensors and the switches will be explained.

The steering angle sensor 110 is a sensor for detecting an angle of turning a vehicle, and, for example, a steering sensor for detecting a steering operation or the like can be used therefor. By a detected signal of the steering sensor 110, it can be determined whether the vehicle advances straight.

The vehicle speed sensor 120 is a sensor for detecting a speed of the vehicle. By a detected signal of the vehicle speed sensor 120, the speed of the vehicle can be determined and it can be determined whether the vehicle is running on a general road or running on a motorway of an automobile exclusive road or the like.

The high/low switching switch 130 is a switch for switching high beam and low beam and is switched in accordance with an operation of a driver of driving the vehicle.

The brightness sensor 140 is a sensor for detecting a brightness of a surrounding of the vehicle. For example, by using the brightness sensor, it can be determined whether the vehicle runs on a dark country road or the like, or runs in a relatively bright urban area.

The rain sensor 150 is a sensor for detecting whether rain falls. By a detected signal of the sensor, it can be determined whether the vehicle runs under rainy weather.

The vehicle height sensor 160 constitutes a portion of means for detecting a pitch angle of the vehicle. According to the embodiment, the switch ON/OFF controller 100 carries out automatic leveling by controlling the motor 18 for leveling based on an output signal outputted by the vehicle height sensor 160.

The switch ON/OFF controller 100 of the embodiment forms a light distribution in accordance with a situation by controlling to switch ON/OFF upper stage light source unit 20 (the first subunit 20a and the second subunit 20b) forming a light distribution for high beam, the middle light source unit 40 (the third subunits 40a, 40b) for forming to cut to converge light for low beam, the fifth subunit 70 of the lower stage light source unit 60 for forming long distance diverging light, the six subunit 80 of the lower stage light source unit 60 for forming short distance diverging light independently from each other based on the outputs from the sensors.

FIG. 16 is a table showing a pattern of the switch ON/OFF control of the switch ON/OFF controller 100.

First, when the high/low switching switch 130 is selected to low, the switch ON/OFF controller 100 forms the low beam light distribution pattern shown in FIG. 10 by not switching on the upper stage light source unit 20 and switching on other light source units 40, 70, 80.

Further, when the high/low switching switch 130 is selected to high, the switch ON/OFF controller 100 forms the high beam light distribution by overlapping the light distribution pattern formed by the upper stage light source unit 20 on the low beam light distribution pattern by further switching on the upper stage light source unit 20. At this occasion, the third subunit 40a and the fourth subunit 40b of the middle light source unit 40 may be pivoted in the right direction to thereby shift the first region D1 formed by the middle stage light source unit 40 to a vicinity of an intersection of H-V lines as shown by FIG. 11. Further, at this occasion, the switch ON/OFF controller 100 may increase the light amount to the front side by increasing light emitting amounts of the light emitting portions 42a of the respective subunits 40a, 40b by increasing power supplied to the middle light source unit 40.

Next, an explanation will be given of various modes of a variable front light distribution system (AFS) realized in a low beam light distribution in reference to FIGS. 17(a) to 17(d) and FIGS. 18(a) to 18(c).

FIGS. 17(a) to 17(d) and FIGS. 18(a) to 18(c) illustrate schematic views respectively showing examples of realizing light distribution patterns for AFS.

First, a curve mode will be explained.

The switch ON/OFF controller 100 determines that the vehicle is going to a curve when, for example, the vehicle is at a predetermined speed and a steering angle is a predetermined value or more based on signals from the steering angle sensor 110 and the vehicle speed sensor 120 in switching on low beam. In this case, the switch ON/OFF controller 100 realizes a light distribution pattern based on the curve mode.

Specifically, in the curve mode, the switch ON/OFF controller 100 makes the upper stage light source unit 20 stay to be switched OFF and switches ON the other light source units 40, 70, 80 similar to the low beam light distribution constituting a base. At this occasion, the switch ON/OFF controller 100 pivots the third and the fourth subunits 40a, 40b of the middle stage light source unit 40 respectively in left and right inverse directions by about 20°. Thereby, as shown by FIG. 17(a), the first region D1 which has been irradiated to a center is divided into two to respectively irradiate in left and right directions. Thereby, left and right optical recognizability in curving is promoted. Further, in the curve mode, the third and the fourth subunits 40a, 40b may be constituted to be pivoted in the same direction, or pivoting angles of the third and the fourth subunits 40a, 40b may be constituted to change in accordance with signals from the steering angle sensor 110 and the vehicle speed sensor 120.

Next, a town mode will be explained.

The switch ON/OFF controller 100 determines that the vehicle is running in an urban area when, for example, the vehicle runs at a predetermined speed or lower in a region having a predetermined brightness based on the signals from the vehicle speed sensor 120 and the brightness sensor 140 in switching on low beam. In this case, the switch ON/OFF controller 100 realizes a light distribution pattern based on the town mode. Here, the town mode signifies a light distribution pattern suitable for running in an urban area having a high possibility that a walker walks on a sideway or the like.

Figure 17:
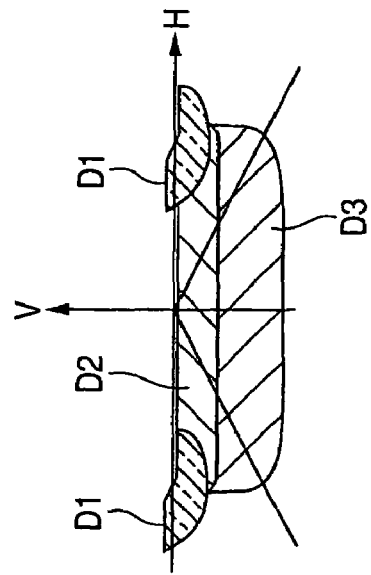
FIGS. 17(a) to 17(d) illustrate schematic views showing examples of realizing light distribution patterns in AFS.
Figure 17:
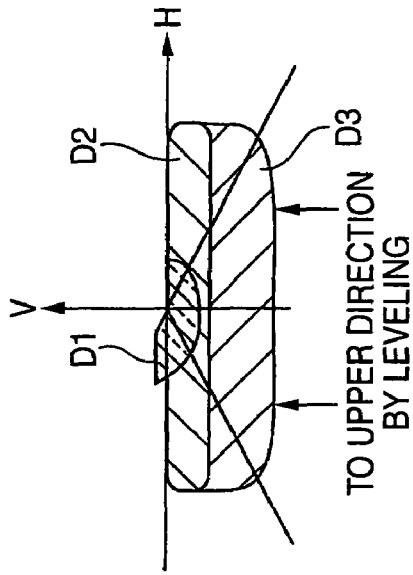
Figure 17:
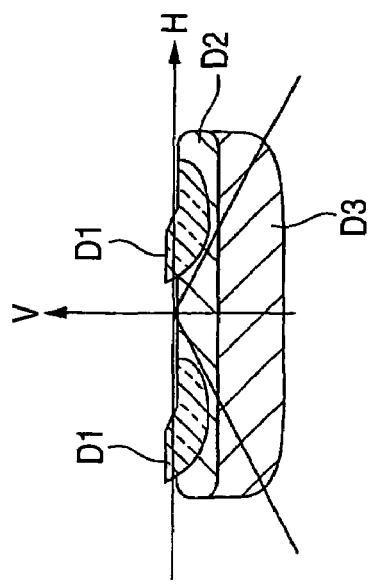
Figure 17:
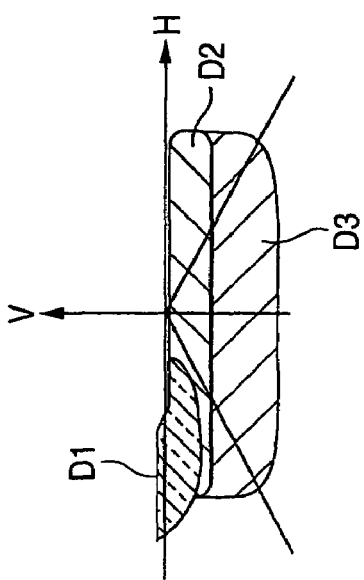

Specifically, in the town mode, the switch ON/OFF controller 100 makes the upper stage light source unit 20 stay to be switched OFF and switches ON the other light source units 40, 70, 80 similar to the low beam light distribution constituting the base. At this occasion, the switch ON/OFF controller 100 pivots the third and the fourth subunits 40*a*, 40*b* of the middle stage light source unit 70 respectively in left and right inverse directions by about 45°. Thereby, as shown by FIG. 17(*b*), the first region D1 which has been irradiated to a center is divided into two to respectively irradiate in left and right side directions. Thereby, light is positively irradiated road shoulders or the like to promote optical recognizability of a walker walking on, for example, the road shoulder.

Further, in the town mode, as a way of producing other light distribution pattern, as shown by FIG. 17(*c*), the third and the fourth subunits 40*a*, 40*b* of the middle stage light source unit 40 may respectively be pivoted only to, for example, the left side by an angle exceeding 20° to thereby diverge light to the road shoulder side by the diverging members 55. Also in this case, light is positively irradiated to the road shoulder or the like to promote optical recognizability of a walker walking on, for example, the road shoulder.

Next, a motorway mode will be explained.

The switch ON/OFF controller 100 determines that the vehicle is running on the automobile exclusive road when, for example, the vehicle runs by a predetermined speed or more based on the signal from the vehicle speed sensor 120 in switching on low beam. In this case, the switch ON/OFF controller 100 realizes a light distribution pattern based on the motorway mode. Here, the motor way mode signifies a light distribution pattern suitable for running on the automobile exclusive road where a walker is not present.

Specifically, in the motor way mode, the switch ON/OFF controller 100 makes the upper stage light source unit 20 stay to be switched OFF and switches ON the other light source units 40, 70, 80 similar to the low beam light distribution constituting the base. At this occasion, the switch ON/OFF controller 100 angularly displaces all of the light source units 20, 40, 60 in upper directions along with, for example, the support member 15 by operating the motor 18 for leveling (by 0.34°, by a range of about 0.1° through 0.5° as an example) (refer to FIG. 17(*d*)). Thereby, light at a vicinity of H line is intensified to promote remote optical recognizability.

Further, in the motor way mode, the switch ON/OFF controller 100 may further increase the light amount to the front side by increasing the light emitting amounts from the respective units 40, 70 by increasing power supplied to the middle light source unit 40 and the fifth subunit 70 for diverging in a long distance. At this occasion, it is preferable to reduce the light emitting amount from the sixth subunit by reducing power supplied to the sixth subunit 80 for diverging in a short distance. Thereby, the light amount irradiated to the near front side of the vehicle is reduced, light irradiated to a vicinity of H line is relatively emphasized to further promote long distance optical recognizability.

Next, the rain mode will be explained.

When the switch ON/OFF controller 100 determines that rain falls in running at, for example, a predetermined speed based on, for example, signals from the vehicle speed sensor 120 and the rain sensor 150 in switching on low beam, the switch ON/OFF controller 100 realizes a light distribution pattern based on the rain mode. Here, the rain mode signifies a light distribution pattern with an object of promoting optical recognizability under rainy weather.

Specifically, in the rain mode, the switch ON/OFF controller 100 makes the upper stage light source unit 20 stay to be switched OFF and switches ON the other light source units 40, 70, 80 similar to the low beam light distribution constituting the base. At this occasion, the switch ON/OFF controller 100 angularly displaces all of the light source units 20, 40, 60, in the upper directions along with, for example, the support member 15 by operating the motor 18 for leveling (by 0.34°, by a range of about 0.1° through 0.5° as an example). Thereby, light at a vicinity of H line is intensified to promote remote optical recognizability.

Further, in the rain mode, the switch ON/OFF controller 100 may further increase the light amount on the front side by increasing the light emitting amounts from the respective units 40, 70 by increasing power supplied to the middle stage light source unit 40 and the fifth subunit 70 for diverging in a long distance. At this occasion, it is preferable to reduce the light emitting amount from the sixth subunit by reducing power supplied to the sixth subunit 80 for diverging in a short distance. Thereby, the light amount irradiated to the near front side of the vehicle is reduced, light irradiated to a vicinity of H line is relatively emphasized, and remote distance optical recognizability is further promoted. Further, although there is a case of deteriorating optical recognizability by randomly reflecting light irradiated to the near front side of the vehicle on a road face under rainy weather, light reflected randomly can be restrained by reducing the light amount in this way. Further, as an optional choice, as shown by FIG. 18(*a*), there may be constructed a constitution of restraining random reflection further positively by preventing the third region D3 from being formed by not switching the sixth subunit 80.

Further, in the rain mode, there may be constructed a constitution in which the switch ON/OFF controller 100 increases to supply power to a light source unit of the third subunit 40*a* and the fourth subunit 40*b* which is disposed on the right side in the direction of advancing the vehicle to thereby increase the light amount and pivots the light source unit in the left direction and increases light of a light source unit of the third subunit 40*a* and the fourth subunit 40*b* which is disposed on the left side in the direction of advancing the vehicle. In this way, as shown by FIG. 18(*b*), the region of the first region D1 is shifted in the left side direction and side optical recognizability can simultaneously be promoted.

Further, in the rain mode, instead of constructing the constitution as shown by FIG. 18(*b*), there may be constructed a constitution in which power is increased to supply to the light source unit of the third subunit 40*a* and the fourth subunit 40*b* which is disposed on the right side in the direction of advancing the vehicle and pivots the light source unit by an angle exceeding 20° in the left direction to thereby positively diverge light in the left direction by the diverging member 55 and only light of the light source unit of the third subunit 40*a* and the fourth subunit 40*b* which is disposed on the left side in the direction of advancing the vehicle is increased. In this case, as shown by FIG. 18(*c*), the region of the first region D1 is further shifted in a state of being diverged in the left side direction and side optical recognizability can further be promoted.

As has been explained above, the vehicle headlamp 10 of the embodiment includes the upper stage light source unit 20, the middle stage light source unit 40, the lower stage light source unit 60 as a plurality of light source units respectively including the light emitting portions as the light sources, and optical members of the projecting lenses, the reflectors and the like for irradiating light from the light emitting portions along the optical axes. The upper stage light source unit 20, the middle stage light source unit 40, the lower stage light source unit 60 are provided in the lamp body 14 constituting the lamp member by way of the support member 15, and the low beam light distribution pattern is formed on the front side of the vehicle by overlapping light from the respective light source units 20, 40, 60. Here, the middle stage light source unit 40 constituting at least one of the plurality of light source units 20, 40, 60 is an optical axis variable light source unit supported by the lamp body 14 to be able to change the optical axis independently from the other optical light source units 20, 60.

Therefore, by pertinently changing the optical axis of the middle stage optical unit 40 and changing an irradiating region, an optimum low beam light distribution pattern can be formed in various situations. Further, in changing the low beam light distribution pattern, only four of the light emitting portions are controlled at maximum and therefore, various light distribution patterns can be realized without increasing a number of the light sources more than necessary. Further, it is not necessary to install the light source unit including a number of the light emitting portions and therefore, the vehicle headlamp can be downsized, a number of the light emitting portions can be made to be smaller than that in the background art and therefore, power consumption can be restrained.

As a specific constitution, the middle stage light source unit 40 constituting the optical axis variable light source unit can form a light converging region including a skewed cutoff line in the low beam light distribution pattern. According to the embodiment, a position of irradiating the light converging region can pertinently be changed and therefore, light can concentratedly be irradiated to a necessary portion in accordance with a situation, and the light distribution patterns in accordance with various situations of the curve mode, the town mode, the motor way mode or the rain mode can be formed.

Further, the middle stage light source unit 40 constituting the optical axis light source unit changes a position of the light converging region between the center of the front of the vehicle and the side of the front side of the vehicle by moving the optical axis substantially in the horizontal direction. By constituting in this way, light can be concentrated on the center portion of the front side of the vehicle, or light can be concentrated on the side portion on the front side of the vehicle as necessary. Further, in order to move the optical axis in the horizontal direction, only the total of the light source unit 40 (according to the embodiment, the third and the fourth subunits 40a, 40b) may be pivoted and therefore, a complicated mechanism is not needed and a number of parts can be restrained from being increased more than necessary.

Further, the middle light source unit 40 constituting the optical axis variable light source unit is constituted by two of the third and the fourth subunits 40a, 40b.

Each of the third and the fourth subunits 40a, 40b can be constituted as a light source of a directly emitted type including a projecting lens 44c as an optical member, arranged with a light emitting portion 42c as a light source at a vicinity of a focal point of the projecting lens 44c for irradiating light directly from the light emitting portion 42c to the font side. By constituting the light source unit of the directly emitted type, a reflector can be omitted, or an installing space thereof can be reduced. Further, when constituting the light source unit of the directly emitted type, light can easily be concentrated on an extremely narrow region and therefore, the light source unit can preferably be used when light is intended to irradiate to pinpoint a certain narrow region.

Further, as shown by FIGS. 4, 5(a) and 5(b), 12(a) to 12(d), and 13(a) to 13(d), the third and the fourth subunits 40a, 40b each can be constituted as a light source unit of a reflecting type including the reflector 46 for reflecting light from the projecting lens 44 as the optical member and the light emitting portion 42c to a vicinity of the focal point of the projecting lens 44 for irradiating light reflected from the reflector 46 to the front side. When constituted as the light source unit of the reflecting type, the reflector is needed, some degree of installing space needs to be ensured, however, by pertinently designing the reflecting face 46a of the reflector 46, light can easily be controlled and therefore, light of a pertinent light amount can easily be concentrated on a necessary region.

Further, according to the embodiment, each of the third and the fourth subunits 40a, 40b of the middle stage light source unit 40 constituting the optical axis variable light source unit is provided with the diverging member 55 for diverging light emitted from the light emitting portion 42a between the projecting lens 44 and the light emitting portion 42a. The diverging member 55 is provided at a position on which light is incident when the third and the fourth subunits 40a, 40b are pivoted and the optical axis is moved from a position of irradiating light to the center of the front side of the vehicle to the side of the front side of the vehicle and therefore, light is diverged by the diverging member 55 only in being pivoted.

Therefore, when light is irradiated to the center region which needs a clear cutoff line, the diverging member 55 does not hamper light from being propagated and when light is irradiated to the side region which does not need so clear cutoff line, the irradiating region can be widened by the pivoting angle or more. Therefore, the vehicle headlamp having high side optical recognizability capable of irradiating light over a wide side region can be constituted.

As the diverging member 55, the prism diverging lens in which the wall thickness along the direction of propagating light is thickened as being remote from the optical axis can be used. By using the prism diverging lens, the irradiating region can be widened by the pivoting angle or more and therefore, side optical recognizability of the vehicle can be promoted.

Further, according to the embodiment, as the diverging member 55, the step diverging lens formed with a plurality of steps can be used. By using the step diverging lens, the irradiating region can be widened over on both left and right sides and therefore, light can be irradiated evenly over the wide region and side optical recognizability of the vehicle can be promoted. Further, the prism diverging lens and the step diverging lens can be used selectively in accordance with a diverging pattern intended by a designer, and when other diverging pattern is intended to provide, other lens for diverging, or other kind of a diverging member may be used.

Further, according to the embodiment, the light source unit 60 in the plurality of the light source units 20, 40, 60 includes the cylindrical lens 65 having the focal line extended in the horizontal direction, the fifth subunit (first subunit) 70 for making light incident on the cylindrical lens 65, and the sixth subunit (second subunit) 80. The fifth subunit 70 is a directly emitted type subunit including the light emitting portion 72a (first light emitting element) for emitting light to a vicinity of the focal line of the cylindrical lens 65 for irradiating light to the front side of the cylindrical lens 65. Further, the sixth subunit 80 is the reflecting type subunit including the light emitting portion (second light emitting element) 82a for emitting light and the reflector 86 for reflecting light from the light emitting portion 82a to a vicinity of the focal line of the cylindrical lens 65 for irradiating light to the front side by way of the cylindrical lens 65.

That is, according to the embodiment, the fifth subunit 70 and the sixth subunit 80 commonly share the single cylindrical lens and therefore, in comparison with a case of providing respectively separate lenses, a number of parts can be reduced and also spaces of attaching members of a lens holder and the like can be made common and therefore, the fifth subunit 70 and the sixth subunit 80 can be arranged to be proximate to each other. Therefore, the lower stage light source unit 60 can be downsized by reducing a space occupied by a total of the lower stage light source unit 60.

Further, according to the embodiment, the light distribution region D3 projected to the front side from the sixth subunit 80 by way of the cylindrical lens 65 is diverged in the vertical direction more than the light distribution region D2 projected to the front side from the fifth subunit 70 by way of the cylindrical lens 65. This is mainly derived from a difference between the directly emitted type and the reflecting type and various light distribution patterns can be realized even when the single cylindrical lens is used.

Further, according to the embodiment, the two light emitting portions 72a, 82a are arranged on the same base member (board) 90. Therefore, in assembling, the two light emitting portions 72a, 82a may be positioned to the single base member 90 to be assembled with other member and therefore, assembling performance can be promoted and accuracies of positioning the two light emitting portions can be promoted by constituting a reference by the single base member 90.

Further, the light emitting portion 72a is arranged at a vicinity of the focal line of the cylindrical lens 65 and above the focal line. Therefore, light projected to the front side by way of the cylindrical lens 65 can be provided with a cutoff line, for example, a diverging region constituting a portion of a horizontal line at a vicinity of H line needing a clear brightness boundary can be formed.

Further, although according to the above-described explanation, the vehicle headlamp 10 has been explained as the vehicle headlamp which can be used both for high beam and low beam, the invention is not limited thereto but, for example, a vehicle headlamp exclusively for low beam can also be constituted by constituting the vehicle headlamp 10 by, for example, excluding the upper stage light source unit 20 and using only the middle stage light source unit 40 and the lower stage light source unit 60. Also in this case, principal operation and effect are the same as those of the case in which the vehicle headlamp 10 can be used both for high beam and low beam.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:
    a plurality of light source units; and
    a lamp member for supporting the plurality of light source units, wherein a low beam light distribution pattern is formed on a front side of a vehicle by overlapping light from the respective light source units;
    wherein one of the plurality of the light source units includes:
        a lens having a focal line extending in a horizontal direction, the lens substantially extending along a direction of the focal line; and
        first and second subunits for irradiating light to the lens;
        the first subunit is a directly emitted type subunit including a first light emitting element for emitting light from a vicinity of the focal line of the lens in a direction of the lens and irradiating light to the front side by way of the lens; and
        the second subunit is a reflecting type subunit including a second light emitting element for emitting light and a reflector for reflecting light from the second light emitting element to a vicinity of the focal line of the lens and irradiating light to the front side by way of the lens.

2. The vehicle headlamp according to claim 1, wherein a light distribution pattern projected from the second subunit to the front side by way of the lens is diverged in a vertical direction more than a light distribution pattern projected from the first subunit to the front side by way of the lens.

3. The vehicle headlamp according to claim 1, wherein the first light emitting element and the second light emitting element are arranged on the same board.

4. The vehicle headlamp according to claim 1, wherein the first light emitting element is arranged at a vicinity of the focal line of the lens and above the focal line.

5. The vehicle headlamp according to claim 1, wherein the light emitted by the first light emitting element is irradiated to the lens without being reflected.

6. The vehicle headlamp according to claim 5, wherein the lens is a cylindrical lens.

7. The vehicle headlamp according to claim 6, wherein the first light emitting element includes a single light emitting face that faces toward the front side.

8. The vehicle headlamp according to claim 7, wherein the second light emitting element includes a single light emitting face that faces toward the reflector.

9. The vehicle headlamp according to claim 8, wherein the single face of the first light emitting element is perpendicular to the single face of the second light emitting element.

10. The vehicle headlamp according to claim 7, wherein the single light emitting face of the first light emitting element is the only light emitting face of the first light emitting element.

11. The vehicle headlamp according to claim 8, wherein the single light emitting face of the second light emitting element is the only light emitting face of the second light emitting element.

12. The vehicle headlamp according to claim 1, wherein the second light emitting element is arranged at a vicinity of the focal line of the lens and below the focal line.

13. The vehicle headlamp according to claim 1, wherein the first light emitting element is disposed in the vicinity of the focal line of the lens, and the second light emitting element is apart from the vicinity of the focal line of the lens in a direction of an optical axis of the headlamp.

14. The vehicle headlamp according to claim 1, wherein the second subunit comprises a reflecting face having a vertical sectional shape substantially in an elliptical shape with a first focal point at a vicinity of the second light emitting element and a second focal point at a vicinity of the focal line of the lens.

* * * * *